US012506567B2

(12) United States Patent
Van Phan et al.

(10) Patent No.: US 12,506,567 B2
(45) Date of Patent: Dec. 23, 2025

(54) SL DATA TRANSMISSION FOR UNICAST SIDELINK BETWEEN USER EQUIPMENTS

(71) Applicant: NOKIA TECHNOLOGIES OY, Espoo (FI)

(72) Inventors: Vinh Van Phan, Oulu (FI); Ling Yu, Kauniainen (FI); Lianghai Ji, Aalborg (DK); Faranaz Sabouri-Sichan, Aalborg (DK); Rudraksh Shrivastava, Erligheim (DE); Sudeep Hegde, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 402 days.

(21) Appl. No.: 18/040,131

(22) PCT Filed: Aug. 4, 2021

(86) PCT No.: PCT/EP2021/071760
§ 371 (c)(1),
(2) Date: Jan. 31, 2023

(87) PCT Pub. No.: WO2022/029172
PCT Pub. Date: Feb. 10, 2022

(65) Prior Publication Data
US 2023/0327822 A1    Oct. 12, 2023

(30) Foreign Application Priority Data

Aug. 7, 2020    (EP) ..................... 20189986

(51) Int. Cl.
*H04L 1/1867*    (2023.01)
*H04W 88/04*    (2009.01)

(52) U.S. Cl.
CPC .......... *H04L 1/1887* (2013.01); *H04L 1/1896* (2013.01); *H04W 88/04* (2013.01)

(58) Field of Classification Search
CPC ... H04L 1/1812; H04L 1/1867; H04L 1/1887; H04L 1/189; H04L 1/1896; H04L 2001/0097; H04L 5/0055; H04W 88/04
See application file for complete search history.

(56) References Cited

U.S. PATENT DOCUMENTS

2015/0256297 A1    9/2015    Yang et al.
2018/0317077 A1    11/2018    Kim et al.
(Continued)

FOREIGN PATENT DOCUMENTS

CN    102077501 A    5/2011
EP    2242306 A1    10/2010
(Continued)

OTHER PUBLICATIONS

International Search Report and Written Opinion for International Application No. PCT/EP2021/071760, mailed on Nov. 5, 2021, 16 pages.
(Continued)

*Primary Examiner* — Pao Sinkantarakorn
(74) *Attorney, Agent, or Firm* — Barta Jones, PLLC

(57) ABSTRACT

An ARQ system for sidelink communication between transmitter and receiver, with the help of cooperative UE, or relay UE is disclosed. The relay intercepts the initial transmission from transmitter to receiver. If the relay does not intercept any ARQ feedback from the receiver (DTX), it retransmits the initial transmission. Upon receiving at least the Sidelink Control Information, SCI, identifying the retransmission, the transmitter terminates the HARQ process, assuming that the relay is now in charge of the retransmission. Upon reception of the retransmission, the receiver feeds back an HARQ ACK to the relay and the transmitter. If the receiver correctly receives the initial transmission, it feeds back an HARQ ACK to the relay and the transmitter and both relay and transmitter stop the HARQ process. If the relay does not (Continued)

successfully receive the initial transmission, it feds back a NACK to the transmitter which performs retransmission to the relay.

9 Claims, 6 Drawing Sheets

(56) References Cited

U.S. PATENT DOCUMENTS

| | | | |
|---|---|---|---|
| 2019/0082495 A1 | 3/2019 | Kim et al. | |
| 2020/0163005 A1 | 5/2020 | Rao et al. | |
| 2020/0178216 A1 | 6/2020 | Huang et al. | |
| 2020/0235868 A1 | 7/2020 | Yu et al. | |
| 2022/0045794 A1* | 2/2022 | Zhao | H04L 1/08 |
| 2023/0171826 A1* | 6/2023 | Selvanesan | H04W 76/14 |
| | | | 370/310 |
| 2023/0276514 A1* | 8/2023 | Basu Mallick | H04L 1/1819 |
| | | | 370/328 |

FOREIGN PATENT DOCUMENTS

| | | |
|---|---|---|
| EP | 2340629 A1 | 7/2011 |
| EP | 3609259 A1 | 2/2020 |
| WO | 2010/034339 A1 | 4/2010 |

OTHER PUBLICATIONS

3GPP TSG RAN WG1 #98bis, R1-1910147; "Discussion on Physical Layer Procedures for NR Sidelink"; Agenda Item: 7.2.4.5; Source: Lenovo, Motorola Mobility; Chongqing, China; Oct. 14-20, 2019; 8 pages.

Communication under Rule 71(3) EPC for European Application No. 20189986.1, mailed on Jun. 14, 2023, 66 pages.

Office action received for corresponding Chinese Patent Application No. 202180053835.1, dated Feb. 17, 2025, 5 pages of office action and no pages of translation available.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"Revised SID: Study on System enhancement for Proximity based Services in 5GS", 3GPP TSG SA Meeting #84, SP-190443, Agenda: 6.4, SA WG2, Jun. 5-7, 2019, 4 pages.

"New SID: Study on NR sidelink relay", 3GPP TSG RAN Meeting #86, RP-193253, Agenda: 9.1.2, Oppo, Dec. 9-12, 2019, pp. 1-5.

Linaghai et al., "Network-assisted Two-hop Vehicle-to-Everything Communication on Highway", IEEE 87th Vehicular Technology Conference (VTC Spring), Jun. 3-6, 2018, 7 pages.

Extended European Search Report received for corresponding European Patent Application No. 20189986.1, dated Feb. 4, 2021, 11 pages.

Notice of Allowance received for corresponding European Patent Application No. 20189986.1, dated Jun. 14, 2023, 8 pages.

Office action received for corresponding Indian Patent Application No. 202347014016, dated Oct. 30, 2023, 6 pages.

* cited by examiner

SL DATA TRANSMISSION FOR UNICAST SIDELINK BETWEEN USER EQUIPMENTS

CROSS-REFERENCE TO RELATED APPLICATIONS

This application is a national stage entry of International Application No. PCT/EP2021/071760, filed Aug. 4, 2021, entitled "SL DATA TRANSMISSION FOR UNICAST SIDELINK BETWEEN USER EQUIPMENTS" which claims the benefit of priority of European Application No. 20189986.1, filed Aug. 7, 2020, both of which are hereby incorporated by reference in their entireties.

FIELD

The following disclosure relates to the field of sidelink, or more particularly relates to systems, apparatuses, and methods for sidelink data transmission for unicast sidelink between user equipments, e.g. Tx UE (UE: User Equipment; Tx UE: Transmitter UE) and Rx UE (Rx UE: Receiver UE). In particular, this disclosure is targeted for 3GPP sidelink (SL) based UE-to-UE relay in Rel'17 and beyond.

BACKGROUND

SL-based UE-to-UE relay is part of Rel'17 SI SP-190443 led by SA2 and RP-193253 led by RAN2.

SL-based UE-to-UE relay has not been specified in 3GPP standards so far.

TS 38.300 provides a description of NR PC5 and NR PC5 based SL communication between UEs in proximity for both in-coverage (IC) and out-of-coverage (0° C.) operations.

PC5 based SL communication is based on transmitter, e.g. Tx UE, oriented one-to-many broadcast principle in which receiver, e.g. Rx UE, needs to monitor over one or more (pre-) configured resource pool(s) for SL reception, regardless of whether SL transmission is for unicast, groupcast or broadcast. IDs of Tx UE, referred to as Source ID (SRC ID), and the receiver, referred to as Destination ID (DST ID), are in part included in SL Control Information (SCI) sent by Tx UE to schedule for a SL transmission of a transport block (TB) and in part included in the header of MAC PDU inside the TB. Rx UE needs to monitor to receive SCI and TB over (pre-) configured resource pool(s) and filter out the one that is meant for Rx UE based on the received DST ID.

NR SL supports Hybrid Automatic Repeat Request (HARQ) with feedback, either NACK (Negative Acknowledgment) only as Opt-1 or ACK (Positive Acknowledgment)/NACK as Opt-2 for groupcast SL between Tx UE and group of Rx UEs and Opt-2 for unicast SL between Tx UE and Rx UE.

NR SL also supports some operations related to SL Radio Link Failure (RLF) of unicast SL, including SL RLF detection by Tx UE. No service continuity and SL RLF recovery has been supported.

The first study on support SL-based UE-to-UE relay has just been started in 3GPP. There have not been any contributions on enhancing SL communication for SL-based UE-to-UE relay in RAN # so far.

SUMMARY OF SOME EXEMPLARY EMBODIMENTS

It is desirable to provide an SL-based UE-to-UE relay that exhibits one or more of the following characteristics:
single-hop NR sidelink-based relay,
low or minimum specification impact,
good service continuity,
impact on user plane protocol stack and control plane procedure, e.g. connection management of relayed connection,
assuming no new physical laser channel/signal.

A possible use-case scenario for such desirable SL-based UE-to UE relay comprises a transmitter, e.g. Tx UE, a receiver, e.g. Rx UE, and a relay device, e.g. R-UE (R-UE: Relay UE). In this scenario, Tx UE is using SL-based UE-to-UE relay via relay device R-UE, to transmit SL data to Rx UE, as the direct SL between Tx UE and Rx UE is currently suffering, e.g. a bad sidelink radio condition or even a SL RLF. It is assumed that an authorized and proper R-UE has been discovered and selected for assisting the communication between Tx UE and Rx UE, and the detailed setup procedure is not the focus of embodiments of this disclosure.

It is inter alia an object of exemplary embodiments to enable and facilitate SL data transmissions between Tx UE and Rx UE using SL-based UE-to-UE relay via R-UE while allowing Tx UE and Rx UE to get back to the direct SL mode (i.e. a direct communication between Tx UE and Rx UE without using relay) from the UE-to-UE relay mode in a seamless manner, quick and efficient with least impacts to current SL standards, as soon as the direct SL mode becomes applicable again.

Further, it is inter alia an object of exemplary embodiments to fulfil, e.g., one or both of the following goals:
(i) To facilitate SL data transmission for unicast SL between Tx UE and Rx UE using SL-based UE-to-UE relay via R-UE; and
(ii) To enable and facilitate a seamless return to the direct SL mode from the current UE-to-UE relay mode as soon as the direct SL mode becomes applicable again for the unicast SL of Tx UE and Rx UE.

According to a first exemplary aspect of the present disclosure, a method is disclosed, the method comprising:
transmitting at least one HARQ transmission of a sidelink transport block, the at least one HARQ transmission including a destination identifier information indicative of a destination identifier for a receiver,
monitoring for a receiver HARQ feedback on the at least one HARQ transmission from the receiver to obtain a receiver HARQ feedback monitoring result,
monitoring for a relay HARQ feedback on the at least one HARQ transmission from a relay device to obtain a relay HARQ feedback monitoring result, and
determining, as a function of the receiver HARQ feedback monitoring result and of the relay HARQ feedback monitoring result, a retransmission decision on whether or not to transmit at least one HARQ retransmission of the sidelink transport block.

The at least one HARQ transmission may be a first HARQ transmission of the sidelink transport block, in particular a first of a number of consecutive HARQ transmissions of the sidelink transport block.

The receiver HARQ feedback may in particular be a positive acknowledgement, e.g. ACK, or a negative acknowledgement, e.g. NACK. Further, no receiver HARQ feedback may be received which is indicative of a discontinuous transmission, e.g. DTX (Discontinuous Transmission).

The relay HARQ feedback may in particular be a negative acknowledgement, e.g. NACK. Further, no receiver HARQ feedback may be received which is indicative of a discontinuous transmission, e.g. DTX.

Generally, a relay HARQ feedback may also be a positive acknowledgment, e.g. ACK, in particular a relay HARQ feedback on a different HARQ transmission than on the at least one HARQ transmission, e.g. on a HARQ retransmission.

Monitoring for a receiver HARQ feedback on the at least one HARQ transmission from the receiver may include: receiving a receiver HARQ feedback on the at least one HARQ transmission, in particular indicative of a positive or negative acknowledgment, or not receiving a receiver HARQ feedback on the at least one HARQ transmission for example within a specified time period, e.g. after transmitting the at least one HARQ transmission, which is indicative of a discontinuous transmission.

Monitoring for a relay HARQ feedback on the at least one HARQ transmission from the relay device may include: receiving a relay HARQ feedback on the at least one HARQ transmission, in particular indicative of a negative acknowledgment, or not receiving a relay HARQ feedback on the at least one HARQ transmission for example within a specified time period, e.g. after transmitting the at least one HARQ transmission, which is indicative of a discontinuous transmission.

In particular, the receiver HARQ feedback monitoring result may be indicative of a positive acknowledgment in case a receiver HARQ feedback indicative of a positive acknowledgment is received during monitoring. Further, the receiver HARQ feedback monitoring result may be indicative of a negative acknowledgment in case a receiver HARQ feedback indicative of a negative acknowledgment is received during monitoring. Further, the receiver HARQ feedback monitoring result may be indicative of a discontinuous transmission in case no receiver HARQ feedback indicative of a positive or negative acknowledgment is received during monitoring.

In particular, the relay HARQ feedback monitoring result may be indicative of a positive acknowledgment in case a relay HARQ feedback indicative of a positive acknowledgment is received during monitoring. Further, the relay HARQ feedback monitoring result may be indicative of a negative acknowledgment in case a relay HARQ feedback indicative of a negative acknowledgment is received during monitoring. Further, the relay HARQ feedback monitoring result may be indicative of a discontinuous transmission in case no relay HARQ feedback indicative of a positive or negative acknowledgment is received during monitoring.

Determining the retransmission decision may, for example, include one or more of the following:
  determining whether a predefined condition for the retransmission decision is fulfilled or not, e.g. a condition within an if-environment or the like, for example by evaluating a logical expression being a function of the receiver HARQ feedback monitoring result and the relay HARQ feedback monitoring result (in such case, the retransmission decision may or may not be stored in a variable.);
  determining a value of a retransmission decision variable, e.g. a Boolean variable, indicative of the retransmission decision, for example by evaluating a logical expression being a function of the receiver HARQ feedback monitoring result and the relay HARQ feedback monitoring result.

It may for example be determined as retransmission decision to transmit the at least one HARQ retransmission. This retransmission decision may, for example, be referred to as "Retransmission!".

Further, it may for example be determined as retransmission decision not to transmit the at least one HARQ retransmission. This retransmission decision may, for example, be referred to as "No retransmission!". The terms "Retransmission!" and "No retransmission!" as used herein are for illustration purpose and non-limiting. It would equally be possible, for example, to use "TRUE" or "yes" instead of "Retransmission!" and "FALSE" or "no" instead of "No transmission!".

With the method described above, it may for example be possible to facilitate SL data transmission between the transmitter and the receiver using SL-based UE-to-UE relay via a relay device.

The method may for instance be performed and/or controlled by a mobile device, e.g. an automated an Internet-of-Things (IoT) device, and/or a User Equipment (UE). For instance, the method may be performed and/or controlled by using at least one processor of the mobile device.

The mobile communication network may for instance be a cellular network. The mobile communication network may for example be a mobile phone network like a 2G/3G/4G/5G/New Radio (NR) and/or future cellular communication network. The 2G/3G/4G/5G/NR cellular radio communication standards are developed by the 3GPP and presently available under http://www.3gpp.org/.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of this disclosure, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the functions, at least one memory storing the program code, or both. Alternatively, they could comprise for instance circuitry that is designed to implement the functions, for instance implemented in a chipset or a chip, like an integrated circuit. In general, the means may comprise for instance one or more processing means or processors.

According to a further exemplary aspect of this disclosure, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of this disclosure may be a module or a component for a device, for example a chip. Alternatively, the disclosed apparatus according to any aspect of the disclosure may be a device, for instance a server or server cloud. The disclosed apparatus according to any aspect of the disclosure may comprise the disclosed components, for instance means, processor, memory, or may further comprise one or more additional components.

Such an apparatus (e.g. a mobile device), as used herein, may for instance be portable (e.g. weigh less than 1, 0.9, 0.8, 0.7, 0.6, 0.5, 0.4, 0.3, 0.2, 0.1 kg, or less), like a mobile phone, personal digital assistance device, computer, laptop computer as a non-limiting examples. The apparatus may for instance comprise or be connectable to a display for displaying information, e.g. a picture or a video that is transferred to the apparatus via the mobile communication network, to name but one non-limiting example. The apparatus may for instance comprise or be connectable to means for outputting sound, e.g. in the form of spoken commands or information.

According to a second exemplary aspect of the present disclosure, a method is disclosed, the method comprising:
  receiving from a transmitter at least one HARQ transmission of a sidelink transport block, the at least one HARQ transmission including a destination identifier information indicative of a destination identifier for a receiver, e.g. Rx UE, and
  at least in the case that the at least one HARQ transmission has been successfully received,
    monitoring for a receiver HARQ feedback on the at least one HARQ transmission from the receiver to obtain a receiver HARQ feedback monitoring result, and
    determining, as a function of the receiver HARQ feedback monitoring result, a relay decision on whether or not to relay data of the at least one HARQ transmission to the receiver.

The at least one HARQ transmission may be a first HARQ transmission of the sidelink transport block, in particular a first HARQ transmission of a number of consecutive HARQ transmission of the sidelink transport block.

The HARQ transmission may in particular be received successfully or unsuccessfully. Receiving the HARQ transmission unsuccessfully may for example include: receiving only part of the HARQ transmission such as the sidelink control information (SCI) that is used for scheduling the HARQ transmission and/or receiving the HARQ transmission with errors and/or receiving the HARQ transmission with errors that cannot be corrected.

The monitoring for a receiver HARQ feedback and the determining of the relay decision is performed at least in the case that the at least one HARQ transmission has been successfully received. The monitoring for a receiver HARQ feedback may for example be based on or enabled by information received in the at least one HARQ transmission, e.g. sidelink control information (SCI) used for scheduling the at least one HARQ transmission.

In particular, monitoring for a receiver HARQ feedback may include:
  deriving a HARQ feedback channel of the receiver, e.g. Rx UE, based on a received SCI of the at least one HARQ transmission,
  monitoring for the receiver HARQ feedback from the receiver on the derived HARQ feedback channel. The monitoring for a receiver HARQ feedback and the determining of the relay decision may, for example, also be performed in the case that the HARQ transmission was received, but unsuccessfully (e.g. in only part or with errors). The monitoring for a receiver HARQ feedback and the determining of the relay decision may, for example, also be performed without previously verifying whether or not the received HARQ transmission has been successfully received.

The receiver HARQ feedback may in particular be a positive acknowledgement, e.g. ACK, or a negative acknowledgement, e.g. NACK. Further, no receiver HARQ feedback may be received which is indicative of a discontinuous transmission, e.g. DTX.

Monitoring for a receiver HARQ feedback on the at least one HARQ transmission from the receiver may include: receiving a receiver HARQ feedback on the at least one HARQ transmission, in particular indicative of a positive or negative acknowledgment, or not receiving a receiver HARQ feedback on the at least one HARQ transmission for example within a specified time period, e.g. after transmitting the at least one HARQ transmission, which is indicative of a discontinuous transmission.

In particular, the receiver HARQ feedback monitoring result may be indicative of a positive acknowledgment in case a receiver HARQ feedback indicative of a positive acknowledgment is received during monitoring. Further, the receiver HARQ feedback monitoring result may be indicative of a negative acknowledgment in case a receiver HARQ feedback indicative of a negative acknowledgment is received during monitoring. Further, the receiver HARQ feedback monitoring result may be indicative of a discontinuous transmission in case no receiver HARQ feedback indicative of a positive or negative acknowledgment is received during monitoring.

Determining the relay decision may, for example, include one or more of the following:
  determining whether a predefined condition for the relay decision is fulfilled or not, e.g. a condition within an if-environment or the like, for example by evaluating a logical expression being a function of the receiver HARQ feedback monitoring result (in such case, the retransmission decision may or may not be stored in a variable.);
  determining a value of a relay decision variable, e.g. a Boolean variable, indicative of the relay decision, for example by evaluating a logical expression being a function of the receiver HARQ feedback monitoring result.

It may for example be determined as retransmission decision to transmit the at least one HARQ retransmission. This retransmission decision may, for example, be referred to as "Relay!". Further, it may for example be determined as retransmission decision not to transmit the at least one HARQ retransmission. This retransmission decision may, for example, be referred to as "No relay!". The terms "Relay!" and "No relay!" as used herein are for illustration purpose and non-limiting. It would equally be possible, for example, to use "TRUE" or "yes" instead of "Relay!" and "FALSE" or "no" instead of "No relay!".

The data of the at least one HARQ transmission may include, e.g., SL data in the TB or the TB as such.

With the method described above, it may for example be possible to facilitate SL data transmission between the transmitter and the receiver using SL-based UE-to-UE relay via a relay device.

The method may for instance be performed and/or controlled by a mobile device, e.g. an automated an Internet-of-Things (IoT) device, and/or a User Equipment (UE). For instance, the method may be performed and/or controlled by using at least one processor of the mobile device.

According to a further exemplary aspect of the disclosure, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the disclosure, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the disclosure, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the disclosure may be a module or a component for a device, for example a chip. Alternatively, the disclosed apparatus according to any aspect of the disclosure may be a device, for instance a server or server cloud. The disclosed apparatus according to any aspect of the disclosure may comprise only the disclosed components, for instance means, processor, memory, or may further comprise one or more additional components.

According to a further exemplary aspect of the disclosure, a system is disclosed, comprising: at least one apparatus according to the first exemplary aspect as disclosed above, and at least one apparatus according to the second exemplary aspect as disclosed above.

With the aspects of the present disclosure described above, it may be possible to facilitate SL data transmission for unicast sidelink between a transmitter, e.g. Tx UE, and a receiver, e.g. Rx UE.

In the following, exemplary features and exemplary embodiments of all aspects of the present disclosure will be described in further detail.

According to an exemplary embodiment of the first exemplary aspect, the method further comprises:
  depending on the retransmission decision, transmitting the at least one HARQ retransmission.

In particular, the transmission of the at least one HARQ retransmission may be carried out if the retransmission decision is "Retransmission!" and deferred if the retransmission decision is "No retransmission!".

According to a further exemplary embodiment of the first exemplary aspect, the HARQ retransmission includes a destination identifier information indicative of a destination identifier for the relay. In this way, the transmitter may, for example, directly address the relay device with the HARQ retransmission so that the relay device can relay the HARQ retransmission to the receiver.

According to a further exemplary embodiment of the first exemplary aspect, determining the retransmission decision includes:
  determining to transmit the at least one HARQ retransmission at least in the case that the receiver HARQ feedback monitoring result is indicative of a discontinuous transmission, e.g. HARQ DTX, and the relay HARQ feedback monitoring result is indicative of a negative acknowledgement, e.g. HARQ NACK.

A receiver HARQ feedback monitoring result indicative of a discontinuous transmission may indicate, for example, that the HARQ transmission has not been received by the receiver so that, for example, relaying via the relay device is desired. Further, a relay HARQ feedback monitoring result indicative of a negative acknowledgement may indicate, for example, that the HARQ transmission has been received by the relay device, but not successfully (e.g. only in part or with errors). In this case the retransmission decision may be determined to be "Retransmission!" so that, for example, a transmission of the retransmission may be carried out and the relay device may successfully receive the retransmission and perform relaying.

According to a further exemplary embodiment of the first exemplary aspect, transmitting the at least one HARQ transmission includes:
  transmitting the at least one HARQ transmission as groupcast sidelink HARQ transmission, e.g., as groupcast sidelink HARQ Opt-2 transmission.

In this way, the at least one HARQ transmission may address the receiver and, e.g., a relay device.

The at least one HARQ transmission may comprise, e.g., a destination group identifier information indicative of a destination group identifier for a destination group. The destination group may in particular comprise the receiver and at least one relay device.

According to an exemplary embodiment, the destination identifier for the receiver may be used as the destination group identifier. In such case, the destination identifier information indicative of the destination identifier for the receiver may also serve as destination group identifier information indicative of the destination group identifier so that for example additional destination group identifier information is not needed. The destination identifier being used as destination group identifier is in particular known to at least the transmitter, e.g. Tx UE, and the relay device, e.g. R-UE. The receiver, e.g. Rx UE, may or may not know that the at least one HARQ transmission is a group cast and/or that the destination identifier is also used as destination group identifier since the receiver knows that the at least one transmission is addressed to it based on the destination identifier. Accordingly, the relay may be visible to the receiver (as in the former case) or invisible to the receiver (as in the latter case).

According to a further exemplary embodiment of the first exemplary aspect, transmitting the at least one HARQ retransmission includes:
  transmitting the at least one HARQ retransmission as unicast sidelink HARQ (re) transmission.

In this way, the at least one HARQ retransmission may directly address the relay device.

The at least one HARQ retransmission may in particular include a destination identifier information indicative of a destination identifier for the relay device.

According to a further exemplary embodiment of the first exemplary aspect, determining the retransmission decision includes:

determining to transmit the at least one HARQ retransmission in the case that the receiver HARQ feedback monitoring result and the relay HARQ feedback monitoring result are each indicative of a negative acknowledgement, e.g. HARQ NACK.

A receiver HARQ feedback monitoring result indicative of a negative acknowledgment may indicate, for example, that the HARQ transmission has been received by the receiver, but not successfully (e.g. only in part or with errors), so that, for example, relaying via the relay device is desired. Further, a relay HARQ feedback monitoring result indicative of a negative acknowledgment may indicate, for example, that the HARQ transmission has been received by the relay device, but not successfully (e.g. only in part or with errors). In this case the retransmission decision may be determined to be "Retransmission!" so that, for example, a transmission of the retransmission may be carried out and the relay device may successfully receive the retransmission and perform relaying.

A receiver HARQ feedback monitoring result indicative of a negative acknowledgment may further indicate, for example, that the receiver becomes reachable to the transmitter, in particular in case of an earlier receiver HARQ feedback monitoring result indicative of a discontinuous transmission. Thus, a return to direct SL mode between receiver and transmitter may become possible.

According to a further exemplary embodiment of the first exemplary aspect, determining the retransmission decision includes:

determining not to transmit the at least one HARQ retransmission in the case that the receiver HARQ feedback monitoring result and the relay HARQ feedback monitoring result are each indicative of a discontinuous transmission, e.g. HARQ DTX.

A receiver HARQ feedback monitoring result indicative of a discontinuous transmission may indicate, for example, that the HARQ transmission could not be received by the receiver so that, for example, relaying via the relay device is desired. Further, a relay HARQ feedback monitoring result indicative of a discontinuous transmission may indicate, for example, that the relay device, in particular according to the second exemplary aspect, has successfully received the at least first HARQ transmission so that no retransmission is required.

By using DTX instead of ACK in order to inform the transmitter about reception, in particular successful reception, of the at least one HARQ transmission, it may be possible for the relay device to better monitor for a receiver HARQ feedback as the relay device is not occupied with sending ACK.

According to a further exemplary embodiment of the first exemplary aspect, the method further includes:

terminating the HARQ process.

In particular, the method may include:

terminating the HARQ process in the case that the receiver HARQ feedback monitoring result and the relay HARQ feedback monitoring result are each indicative of a discontinuous transmission, e.g. HARQ DTX.

A receiver HARQ feedback monitoring result indicative of a discontinuous transmission may indicate, for example, that the HARQ transmission could not be received by the receiver so that, for example, relaying via the relay device is desired. Further, a relay HARQ feedback indicative of a discontinuous transmission may indicate, for example, that the relay device, in particular according to the second exemplary aspect, has successfully received the HARQ transmission and that it may be expected, for example, that the relay device relays data from the HARQ transmission to the receiver, so that the HARQ process may be terminated.

Terminating the HARQ process may be performed with or without detecting that the relay devices is relaying the data to the receiver.

According to a further exemplary embodiment of the first exemplary aspect, determining the retransmission decision includes:

determining not to transmit the at least one HARQ retransmission in the case that the receiver HARQ feedback monitoring result is indicative of a negative acknowledgement, e.g. HARQ NACK, and the relay HARQ feedback monitoring result is indicative of a discontinuous transmission, e.g. HARQ DTX.

A receiver HARQ feedback monitoring result indicative of a negative acknowledgement may indicate, for example, that the HARQ transmission has been received by the receiver, but not successfully (e.g. only in part or with errors), so that, for example, relaying via the relay device is desired. Further, a relay HARQ feedback monitoring result indicative of a discontinuous transmission may indicate, for example, that the relay device, in particular according to the second exemplary aspect, has successfully received the HARQ transmission so that no retransmission is required.

According to a further exemplary embodiment of the first exemplary aspect, the method further includes:

terminating the HARQ process in the case that the receiver HARQ feedback monitoring result is indicative of a negative acknowledgement, e.g. HARQ NACK, and the relay HARQ feedback monitoring result is indicative of a discontinuous transmission, e.g. HARQ DTX.

A receiver HARQ feedback monitoring result indicative of a negative acknowledgement may indicate, for example, that the HARQ transmission has been received by the receiver, but not successfully (e.g. only in part or with errors), so that, for example, relaying via the relay device is desired. Further, a relay HARQ feedback monitoring result indicative of a discontinuous transmission may indicate, for example, that the relay device, in particular according to the second exemplary aspect, has successfully received the HARQ transmission and that it may be expected, for example, that the relay device relays data from the HARQ transmission to the receiver, so that the HARQ process may be terminated.

Terminating the HARQ process may be performed with or without detecting that the relay devices is relaying the data to the receiver.

A receiver HARQ feedback monitoring result indicative of a negative acknowledgment may further indicate, for example, that the receiver becomes reachable to the transmitter, in particular in case of an earlier receiver HARQ feedback monitoring result indicative of a discontinuous transmission. Thus, a return to direct SL mode between receiver and transmitter may become possible.

According to a further exemplary embodiment of the first exemplary aspect, determining the retransmission decision includes:

determining not to transmit the at least one HARQ retransmission in the case that the receiver HARQ feedback monitoring result is indicative of a positive acknowledgement, e.g. HARQ ACK.

A receiver HARQ feedback monitoring result indicative of a positive acknowledgement may indicate, for example, that the HARQ transmission could be successfully received by the receiver so that, for example, relaying via the relay device and/or transmission of the retransmission is not necessary. In particular, the transmitter may return to direct SL mode with or without releasing the relay device.

According to a further exemplary embodiment of the first exemplary aspect, the method further includes:
  terminating the HARQ process in the case that the receiver HARQ feedback monitoring result is indicative of a positive acknowledgment, e.g. HARQ ACK.

A receiver HARQ feedback monitoring result indicative of a positive acknowledgement may indicate, for example, that the HARQ transmission could be successfully received by the receiver so that, for example, relaying via the relay device and/or transmission of the retransmission is not necessary. Thus, the HARQ process may for example be terminated.

According to a further exemplary embodiment of the first exemplary aspect, the method further comprises:
  releasing the relay device.

In particular, the method may further comprise, releasing the relay device depending on the receiver HARQ feedback monitoring result. The relay device may for example be released if the receiver HARQ feedback monitoring result is indicative of a positive acknowledgement.

According to a further exemplary embodiment of the first exemplary aspect, the at least one HARQ transmission of the sidelink transport block is a first HARQ transmission of the sidelink transport block, in particular the first of more than one for example consecutive HARQ transmissions of the sidelink transport block.

According to a further exemplary embodiment of the first exemplary aspect, the method further comprises:
  transmitting more than one consecutive HARQ transmissions of the sidelink transport block,
  monitoring for respective receiver HARQ feedbacks on the respective HARQ transmissions from the receiver to obtain respective receiver HARQ feedback monitoring results and
  monitoring for respective relay HARQ feedbacks on the respective HARQ transmissions from the relay device to obtain respective relay HARQ feedback monitoring results,
  determining, as a function of the respective receiver HARQ feedback monitoring results and of the respective relay HARQ feedback monitoring results, a respective retransmission decision on whether or not to transmit at least one respective HARQ retransmission of the sidelink transport block.

More than one consecutive HARQ (re-) transmissions including the first HARQ transmission of the TB may be transmitted, e.g. by the transmitter, e.g. by using enhanced SL HARQ Opt-2 for reassuring purpose (that the relay device is expected to receive the TB successfully). That is, the transmitter may detect/receive DTX from the relay device and NACK/DTX from the receiver for all these HARQ (re-) transmissions before terminating the HARQ process.

According to a further exemplary embodiment of the first exemplary aspect, the more than one consecutive HARQ transmissions of the sidelink transport block include the first HARQ transmission of the sidelink transport block.

According to a further exemplary embodiment of the first exemplary aspect, the method further comprises:
  monitoring for a message including sidelink control information (SCI) from the relay device to the receiver to obtain an SCI monitoring result, and,
  optionally, determining a termination decision on whether or not to terminate HARQ process as a function of the SCI monitoring result.

The transmitter may monitor, for example, at least SCI sent by the relay device to the receiver, wherein the SCI may be used by the relay device to schedule a data transmission to the receiver, for reassuring purpose that the relay device is receiving and relaying data from the transmitter to the receiver. This monitoring may for example be used for the transmitter to determine whether to terminate the HARQ process or not.

Terminating the HARQ process may in particular include terminating any transmission of HARQ transmissions or retransmission of the (current) sidelink transport block.

Determining the termination decision may, for example, include one or more of the following:
  determining whether a predefined condition for the termination decision is fulfilled or not, e.g. a condition within an if-environment or the like, for example by evaluating a logical expression being a function of the SCI monitoring result (in such case, the retransmission decision may or may not be stored in a variable.);
  determining a value of a termination decision variable, e.g. a Boolean variable, indicative of the retransmission decision, for example by evaluating a logical expression being a function of the SCI monitoring result.

It may for example be determined as termination decision to terminate the HARQ process. This termination decision may, for example, be referred to as "Termination!". Further, it may for example be determined as termination decision not to terminate the HARQ process. This termination decision may, for example, be referred to as "No termination!". The terms "Termination!" and "No termination!" as used herein are for illustration purpose and non-limiting. It would equally be possible, for example, to use "TRUE" or "yes" instead of "Termination!" and "FALSE" or "no" instead of "No termination!".

According to a further exemplary embodiment of the first exemplary aspect, the method further comprises:
  monitoring for a sidelink HARQ feedback from the receiver to the relay to obtain a SL HARQ feedback monitoring result, and
  optionally, determining a releasing decision on whether or not to release the relay device as a function of the SL HARQ feedback monitoring result.

The transmitter may monitor SL HARQ feedback from receiver to the relay device while the relay device is relaying data to the receiver using the unicast SL HARQ, provided that the transmitter receives the at least SCI according to the previous exemplary embodiment and derives the Physical SL Feedback Channel (PSFCH) resource which is used by the receiver to send SL HARQ feedback to the relay device.

This monitoring may be used, for example, for determining whether the receiver becomes reachable to the transmitter directly or not and therefore whether the relay is still needed or not.

Determining the releasing decision may, for example, include one or more of the following:
  determining whether a predefined condition for the releasing decision is fulfilled or not, e.g. a condition within an if-environment or the like, for example by evaluating a logical expression being a function of the SL HARQ feedback monitoring result (in such case, the retransmission decision may or may not be stored in a variable.);

determining a value of a releasing decision variable, e.g. a Boolean variable, indicative of the retransmission decision, for example by evaluating a logical expression being a function of the SL HARQ feedback monitoring result.

It may for example be determined as releasing decision to release the relay device. This releasing decision may, for example, be referred to as "Releasing!". Further, it may for example be determined as releasing decision not to release the relay device. This releasing decision may, for example, be referred to as "No releasing!". The terms "Releasing!" and "No releasing!" as used herein are for illustration purpose and non-limiting. It would equally be possible, for example, to use "TRUE" or "yes" instead of "Releasing!" and "FALSE" or "no" instead of "No releasing!".

According to a further exemplary embodiment of the first exemplary aspect, the method further comprises:
monitoring for a sidelink HARQ feedback from the receiver to the transmitter or to the relay to obtain a SL HARQ feedback monitoring result, and
depending on the SL HARQ feedback monitoring result, releasing of the relay device.

The transmitter may in particular release the relayed connection and/or the relay device when the receiver becomes reachable directly and properly to the transmitter based on monitoring SL HARQ feedback from the receiver, as sent by the receiver to either the transmitter or to the relay device.

According to a further exemplary embodiment of the first exemplary aspect, the transmitter, e.g. Tx UE, may either use the ID of the relay device, e.g. R-UE, or keep using the ID of the receiver, e.g. Rx UE, or to alternate between them flexibly as DST ID for sending data to the relay device and/or both relay device and receiver even when the direct SL is currently suffering from RLF.

According to a further exemplary embodiment of the first exemplary aspect, the transmitter, e.g. Tx UE may determine which ID of the relay device, e.g. R-UE, and the receiver, e.g. Rx UE, is used as DST ID for SL transmission based on, e.g., whether the relay is for SL dual-connectivity (for duplication or split of SL data from the transmitter to the receiver) or for SL RLF recovery, or for power saving of the transmitter; whether the relay is visible or invisible to the receiver (ID of either the transmitter or the relay device may, e.g., be used as SRC ID by the relay device to relay data to the receiver in the visible relay and ID of the transmitter may be used as SRC ID by the relay device in the invisible relay).

According to a further exemplary embodiment of the first exemplary aspect, the transmitter, e.g. Tx UE, may keep maintaining and using the SL radio-bearer (RB) contexts of the direct SL between the transmitter and the receiver, e.g. Rx UE, in the relay mode via the relay device, e.g. R-UE, even when the direct SL is currently suffering from RLF. This may imply that the relay device may preserve all SL RB contexts of the direct SL mode received from the transmitter and use that as such or with 1:1 mapping to relay corresponding data to the receiver if needed (for the invisible relay for example). The current SL PDCP duplication detection may be reused as such at the receiver, as the receiver may receive same PDCP PDU from both the relay device and the transmitter on both the relayed and direct connections.

According to a further exemplary embodiment of the first exemplary aspect, the method further includes:
executing a relay setup procedure for setting up the relay device.

In particular, the relay setup procedure is executed before transmission of the at least one HARQ transmission. The relay setup procedure in particular includes transmission of sidelink control messages including identifier information indicative of the identifier of the receiver and/or of the transmitter. Such sidelink control messages may in particular be received by the relay device. In this way, the relay device may be informed about the identifiers of the transmitter and/or the receiver.

The UE-to-UE relay setup procedure may include the configuration of the proposed enhanced groupcast procedure. Thus, the relay device can be aware of the groupcast transmission by using the ID of the receiver as the DST ID for the groupcast. In addition, the relay device can also be aware of its dedicated PSFCH resource, if it needs to send NACK back to the transmitter.

According to a further exemplary embodiment of the first exemplary aspect, the method is executed by or with a mobile device and/or an Internet-of-Things, IoT device. In particular, the transmitter may be a mobile device and/or an Internet-of-Things, IoT device.

According to an exemplary embodiment of the second exemplary aspect, determining the relay decision includes:
determining to relay data of the at least one HARQ transmission to the receiver if the receiver HARQ feedback monitoring result is indicative of a discontinuous transmission, e.g. HARQ DTX.

A receiver HARQ feedback monitoring result indicative of a discontinuous transmission may indicate, for example, that the HARQ transmission could not be received by the receiver so that, for example, relaying via the relay device is desired. Therefore, in such case, the relay decision may be determined to be "Relay!".

According to a further exemplary embodiment of the second exemplary aspect, determining the relay decision includes:
determining to relay data of the at least one HARQ transmission to the receiver if the receiver HARQ feedback monitoring result is indicative of a negative acknowledgement, e.g. HARQ NACK.

A receiver HARQ feedback indicative of a negative acknowledgment may indicate, for example, that the HARQ transmission has been received by the receiver, but not successfully (e.g. only in part or with errors), so that, for example, relaying via the relay device is desired. Therefore, in such case, the relay decision may be determined to be "Relay!".

According to a further exemplary embodiment of the second exemplary aspect, the method further comprises:
transmitting to the transmitter a relay HARQ feedback indicative of a negative acknowledgement, e.g. HARQ NACK, if the at least one HARQ transmission was unsuccessfully received.

In this way, the transmitter may be informed that the HARQ transmission was unsuccessfully received so that transmission of a HARQ retransmission is desirable so that the relay device is able to successfully receive the retransmission and, if necessary, to relay data from the HARQ retransmission to the receiver.

According to a further exemplary embodiment of the second exemplary aspect, the method further comprises:
receiving from the transmitter at least one HARQ retransmission of the sidelink transport block.

In particular, the method may further comprise: after transmitting a relay HARQ feedback indicative of a negative acknowledgement, receiving from the transmitter at least one HARQ retransmission of the sidelink transport block.

The HARQ retransmission may in particular include destination identifier information indicative of the destination identifier of the relay device.

According to a further exemplary embodiment of the second exemplary aspect, the method further comprises:
if the at least one HARQ transmission has been successfully received, skipping transmission of a relay HARQ feedback indicative of a positive acknowledgment, e.g. HARQ ACK, to the transmitter.

In this way, the transmitter, for example a transmitter according to the first exemplary aspect, may infer from a discontinuous transmission from the relay device that the HARQ transmission has been successfully received, so that e.g. no retransmission is necessary, and that the relay device will, for example, relay data from the transmission to the receiver.

The relay HARQ feedback may in particular be transmitted on dedicated Physical SL Feedback Channel (PSFCH), according to SL HARQ Opt-2, either as groupcast SL HARQ on the at least one HARQ transmission or as unicast SL HARQ on the at least one HARQ retransmission.

According to a further exemplary embodiment of the second exemplary aspect, the method further comprises:
depending on the relay decision, relaying data of the at least one HARQ transmission or HARQ retransmission to the receiver.

In particular, the relaying of the data of the at least one HARQ transmission or of the HARQ retransmission may be carried out if the retransmission decision is "Relay!" and skipped if the retransmission decision is "No relay!".

According to a further exemplary embodiment of the second exemplary aspect, the method further comprises:
monitoring for a sidelink HARQ feedback on the relayed data from the receiver to obtain a sidelink HARQ feedback monitoring result.

In this way, the relay device may monitor whether the relaying was successful or not.

Monitoring for a sidelink HARQ feedback on the relayed data from the receiver may in particular include monitoring for a sidelink HARQ feedback on the relayed data from the receiver.

According to a further exemplary embodiment of the second exemplary aspect, the relay device, e.g. R-UE, may monitor SL HARQ feedback from the receiver, e.g. Rx UE, to the transmitter, e.g. Tx UE. In this way, the relay device may be able to decide whether SL data in the scheduled TB or the scheduled TB as such needs to be relayed to the receiver or not.

According to a further exemplary embodiment of the second exemplary aspect, relaying a TB from a relay device, e.g. R-UE, to a receiver, e.g. Rx UE, may use either the same or the different HARQ process than the original transmission from the transmitter, e.g. Tx UE.

In particular, in case the relayed TB uses a different HARQ process, the receiver, e.g. Rx UE, may for example use the receptions from the relay device, e.g. R-UE, to decode.

Further in particular, in the other case if the relayed TB uses the same HARQ process, the receiver, e.g. Rx UE, may for example use the receptions from both the relay device, e.g. R-UE, and the transmitter, e.g. Tx UE, to decode. In this case, the transmitter may for example start/pause its transmission for a new TB, e.g. upon receiving an indication from the relay device regarding whether the previous TB using the same HARQ process is acknowledged by the receiver or not.

According to a further exemplary embodiment of the second exemplary aspect, the at least one HARQ transmission of the sidelink transport block is a first HARQ transmission of the sidelink transport block, in particular the first of more than one for example consecutive HARQ transmissions of the sidelink transport block.

According to a further exemplary embodiment of the second exemplary aspect, the method is executed by or with a mobile device and/or an Internet-of-Things, IoT device. In particular, the relay device may be a mobile device and/or an Internet-of-Things, IoT device.

The features and example embodiments of the disclosure described above may equally pertain to the different aspects according to the present disclosure.

It is to be understood that the presentation of the disclosure in this section is merely by way of examples and non-limiting.

Other features of the disclosure will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show.

DETAILED DESCRIPTION OF SOME EXEMPLARY EMBODIMENTS

The following description serves to deepen the understanding of the present disclosure and shall be understood to complement and be read together with the description as provided in the above summary section of this specification.

Figure 1:
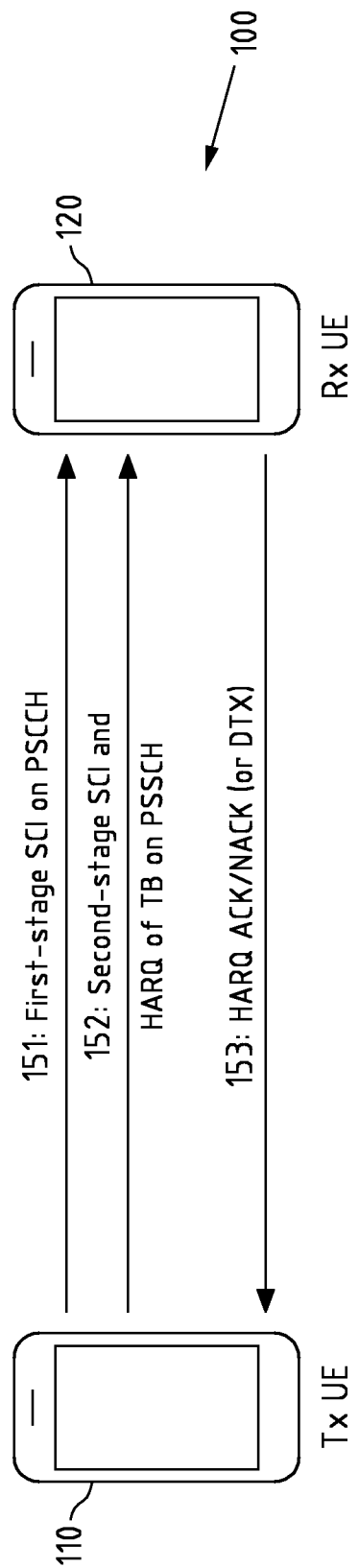
FIG. 1 a schematic block diagram of a system according to an exemplary aspect.

FIG. 1 is an example of a schematic high-level block diagram illustrating SL transmission between a transmitter 110 and a receiver 120 of a system 100 using HARQ Opt-2 for a unicast SL. In this example, transmitter 110 is a user equipment Tx UE and receiver is a user equipment Rx UE. Tx UE and Rx UE may each be a mobile device such as a cellular phone.

HARQ Opt-2 for a unicast SL may comprise some or all of the following steps:

Step 151: Tx UE transmits to Rx UE a first-stage Sidelink Control Information (SCI) on Physical SL Control Channel (PSCCH)

Step 152: Tx UE transmits to Rx UE a second-stage SCI and HARQ of TB on Physical SL Shared Channel (PSSCH)

Step 153: Tx UE expects feedback on the TB from Rx UE. This feedback may be positive acknowledgement, e.g. HARQ ACK, negative acknowledgement, e.g. HARQ NACK, or, if, e.g. within a specified time period, no feedback is received by Tx UE, discontinuous transmission, e.g. HARQ DTX.

Figure 2:
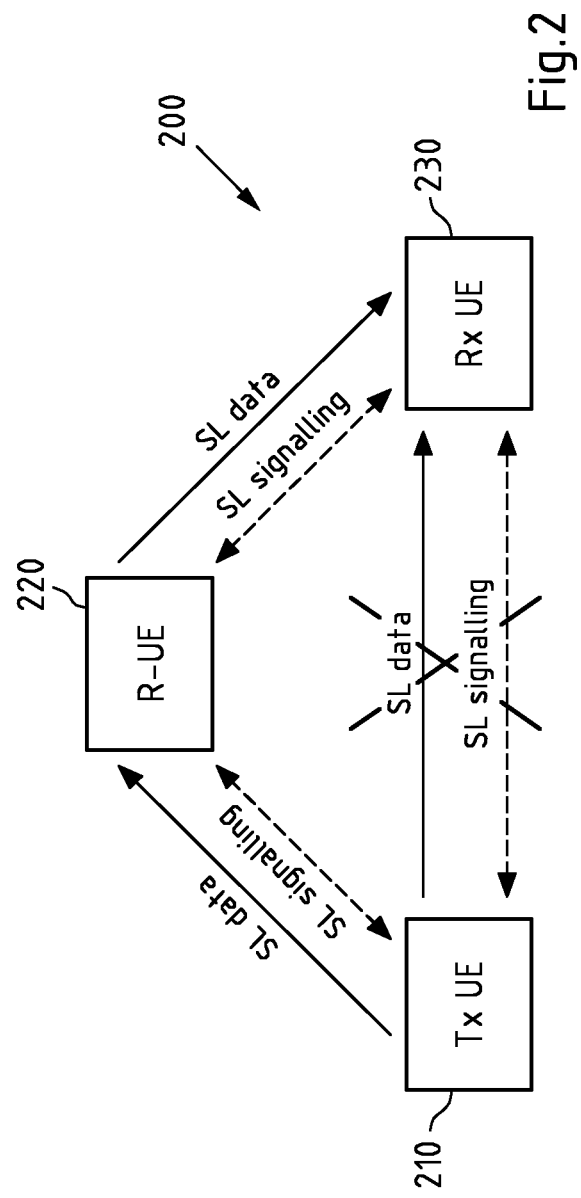
FIG. 2 a schematic block diagram of a system according to an exemplary aspect.

FIG. 2 is an example of a schematic high-level block diagram of a system according to an exemplary aspect of the present disclosure. The system 200 comprises a transmitter Tx UE 210, a receiver Rx UE 230 and a relay R-UE 220.

Tx UE 210 is using SL-based UE-to-UE relay via relay device R-UE 220, to transmit SL data to Rx UE 230, as the direct SL between Tx UE 210 and Rx UE 230 is currently suffering, e.g. a bad sidelink radio condition or even a SL RLF. It is assumed that an authorized and proper R-UE 220 has been discovered and selected for assisting the communication between Tx UE 210 and Rx UE 230.

The process for the SL-based UE-to-UE relay from a transmitter, e.g. Tx UE 210, to a receiver, e.g. Rx UE 230, via a relay device, e.g. R-UE 220, may comprise some or all steps of the following HARQ scheme which is for example based on a hybrid groupcast-unicast SL HARQ Opt-2:

1. Tx UE may send at least the first HARQ transmission of a SL TB to both R-UE and Rx UE based on using, e.g., an enhanced groupcast SL HARQ Opt-2 wherein ID of Rx UE is used as DST ID to address the sending, for example, with the following enhancements:
   a. Rx UE may behave as in the current SL HARQ Opt-2 (no enhancement is made towards Rx UE). Thus, when Rx UE is able to receive the SL TB indicated by the received SCI either successfully or not, Rx UE may send HARQ ACK/NACK, respectively, to Tx UE (e.g. on PSFCH mapped on the resources used for sending the TB, as indicated in the received SCI coupled with IDs of Tx UE and Rx UE), for example as specified in the regular SL HARQ Opt-2. Otherwise, if Rx UE fails to receive the transmitted SCI from Tx UE, HARQ DTX (e.g. no receiver HARQ feedback) from Rx UE is expected by Tx UE.
   b. In case R-UE receives the SL TB successfully, instead of sending a HARQ ACK to Tx UE as in the regular SL HARQ Opt-2, R-UE may be configured to monitor HARQ ACK/NACK/DTX of Rx UE in (1.a.) and determine whether to relay SL data in the received TB or the received TB as such to Rx UE or not. In this case, as HARQ DTX from R-UE is expected by Tx UE, it enables R-UE to monitor the HARQ of Rx UE. It is noted that R-UE is, for example, able to derive the dedicated PSFCH of Rx UE and monitor HARQ feedback from Rx UE based on the received SCI from Tx UE and IDs of both Rx UE and Tx UE known to R-UE during the relay setup.
      i. Table 1 below provides possible options and outcomes of this determining step.
   c. In case R-UE receives the SL TB unsuccessfully, R-UE may be configured to send HARQ NACK to Tx UE, as in the regular SL HARQ Opt-2.
2. Tx UE receives HARQ feedback from R-UE and Rx UE on at least the first HARQ transmission of the SL TB based on using the groupcast SL HARQ Opt-2, expecting either HARQ ACK or HARQ NACK or HARQ DTX from Rx UE and either HARQ NACK or HARQ DTX, i.e., no HARQ ACK, from R-UE, as mentioned in (1.b.)
3. Tx UE sends at least one HARQ retransmission of the SL TB to R-UE based on using the unicast SL HARQ Opt-2 wherein ID of R-UE is used as DST ID to address the sending at least in case Tx UE receives HARQ NACK from R-UE and detects HARQ DTX from Rx UE in Step 2.

By using the groupcast SL HARQ Opt-2 for at least the first HARQ transmission of the SL TB in Step 1, the proposal enables Tx UE to detect whether Rx UE may be reachable directly or not and how, as compared to R-UE, based on monitoring HARQ feedback from both Rx UE and R-UE in Step 2. This in turn may help Tx UE to determine whether the current UE-to-UE relay via R-UE is still needed or not without any additional control overhead. That is, a seamless return from the UE-to-UE relay mode to the direct SL mode is enabled for Tx UE upon, for examples, receiving HARQ ACK from Rx UE on the first HARQ transmission in Step 1. Otherwise, Tx UE keeps using the UE-to-UE relay mode and in Step 3 Tx UE retransmits the SL TB to only R-UE using unicast SL HARQ in case it detects HARQ DTX from Rx UE and NACK from R-UE.

Table 1 below provides examples of UE behaviours/operations in light of Tx UE, according to possible monitored HARQ feedback received from Rx UE and R-UE in Step 2 in the HARQ scheme described above. The present disclosure is not limited to these examples.

TABLE 1

| On at least the one, e.g. 1st, HARQ transmission of the SL TB using SL groupcast HARQ | 1. DTX from Rx UE | 2. NACK from Rx UE | 3. ACK from Rx UE |
| --- | --- | --- | --- |
| 1. DTX from R-UE | (1.1) Tx UE expects R-UE to relay the data to Rx UE and terminates the HARQ process with/without detecting that R-UE is relaying the data to Rx UE | (1.2) Tx UE expects R-UE to relay the data to Rx UE and terminates the HARQ process with/without detecting that R-UE is relaying the data to Rx UE; Rx UE becomes | (1.3) Tx UE terminates the HARQ process; Rx UE becomes reachable to Tx UE and may get back to the direct mode with/without releasing R-UE |

TABLE 1-continued

| On at least the one, e.g. 1st, HARQ transmission of the SL TB using SL groupcast HARQ | 1. DTX from Rx UE | 2. NACK from Rx UE | 3. ACK from Rx UE |
|---|---|---|---|
| 2. NACK from R-UE | (2.1) Tx UE retransmits the TB to R-UE as unicast and expects R-UE to relay the data to Rx UE | reachable to Tx UE (2.2) Tx UE retransmits the TB to R-UE as unicast and expects R-UE to relay the data to Rx UE; Rx UE becomes reachable to Tx UE | (2.3) Tx UE terminates the HARQ process; Rx UE becomes reachable and may get back to the direct mode with releasing R-UE |

Figure 3:
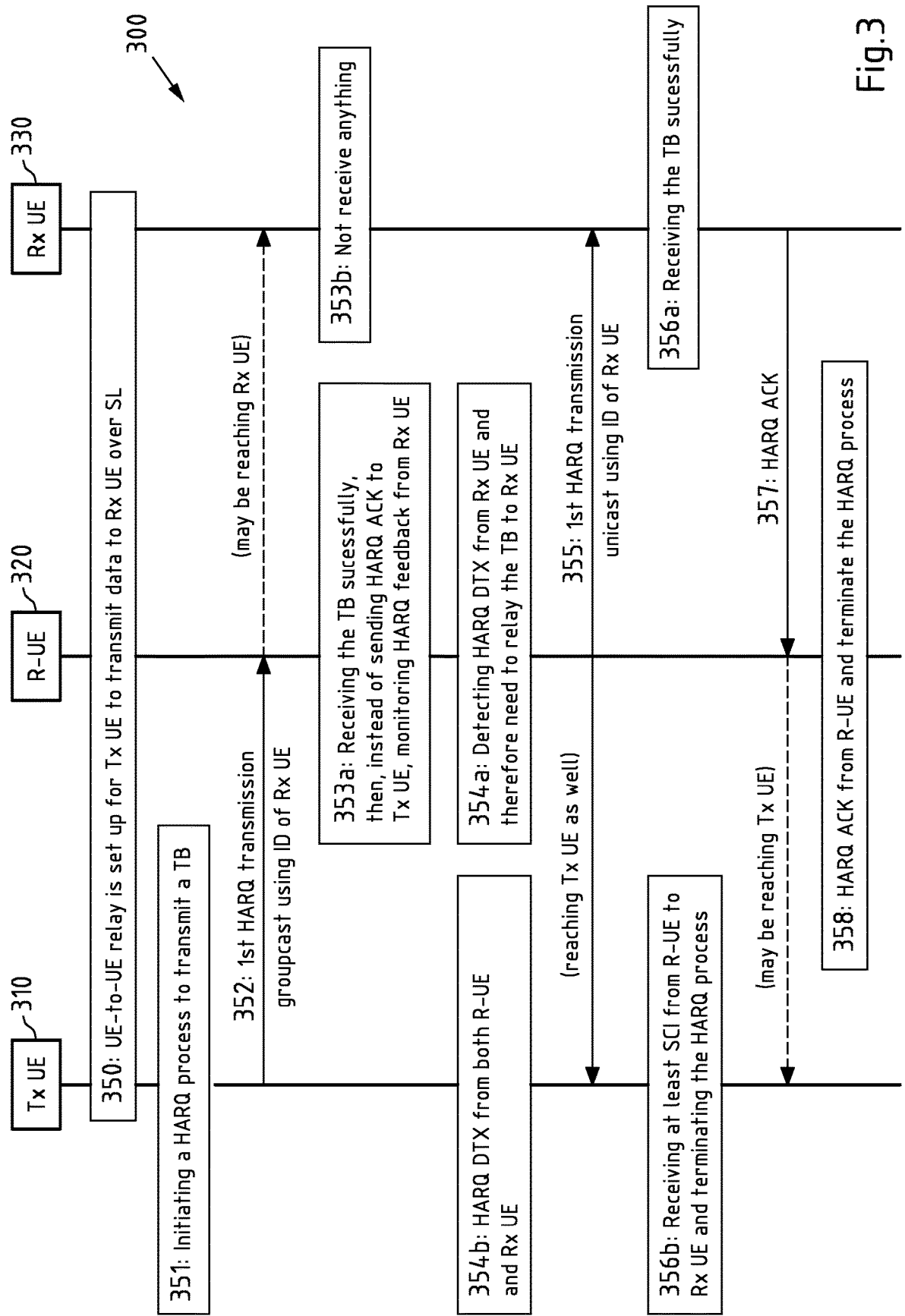
FIG. 3 a signaling chart showing an example embodiment of a method according to the first exemplary aspect and further showing an example embodiment of a method according to the second exemplary aspect.
Figure 4:
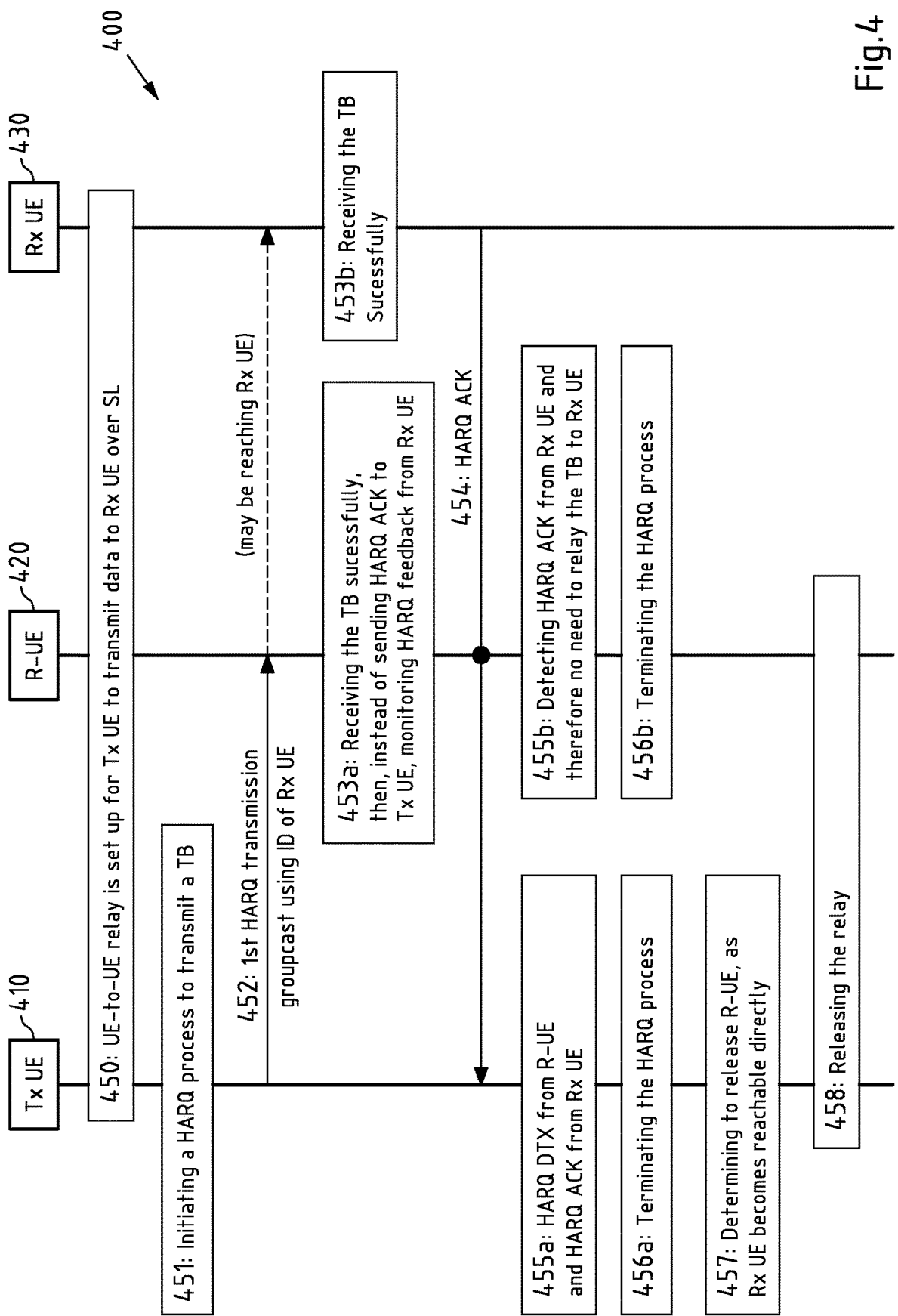
FIG. 4 a signaling chart showing a further example embodiment of a method according to the first exemplary aspect and further showing a further example embodiment of a method according to the second exemplary aspect.
Figure 5:
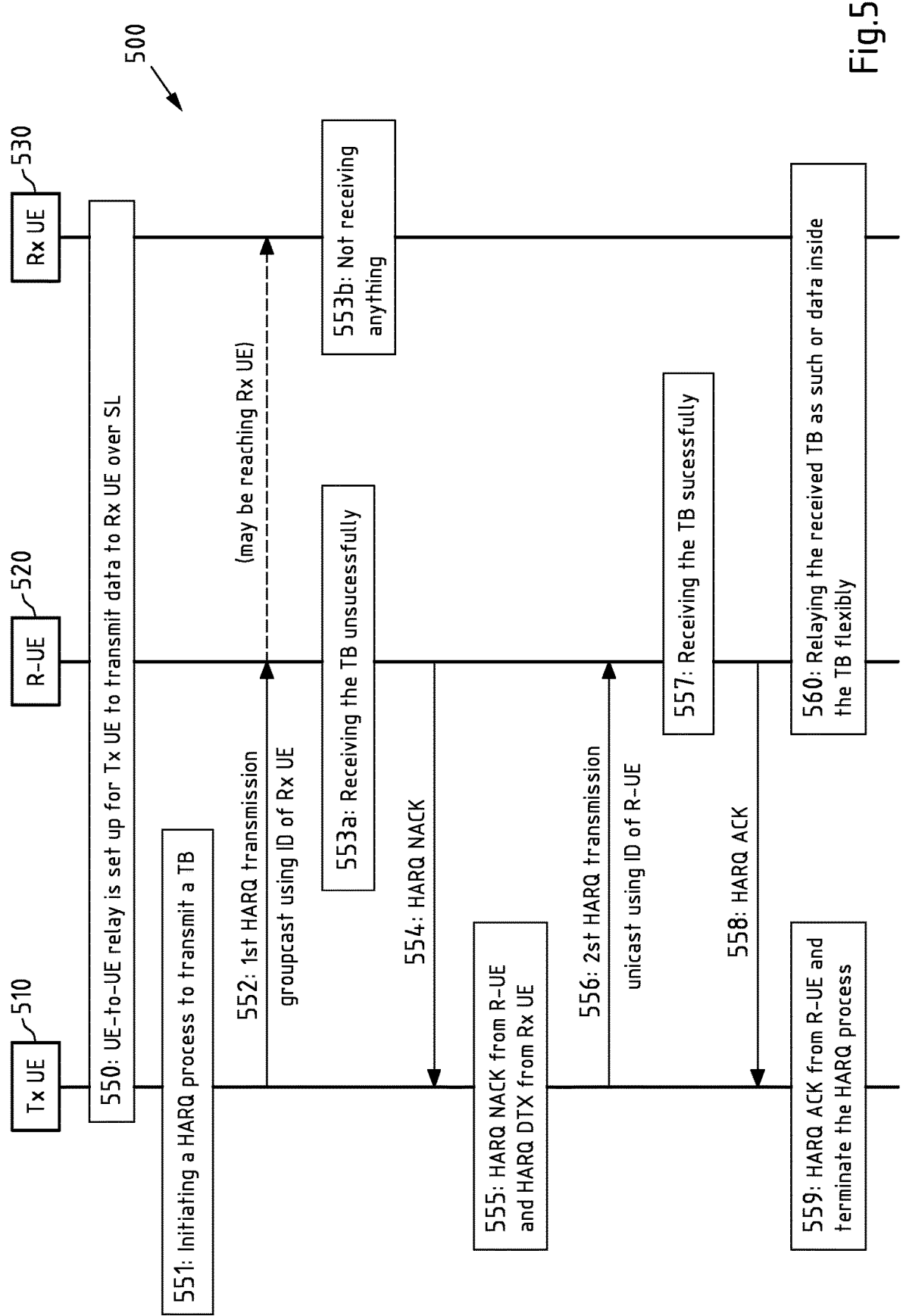
FIG. 5 a signaling chart showing a further example embodiment of a method according to the first exemplary aspect and further showing a further example embodiment of a method according to the second exemplary aspect.

The following FIGS. 3-5 in particular illustrate signaling charts corresponding to case (1.1), case (1.3) and case (2.1) described in Table 1.

FIG. 3 is a signaling chart 300 showing an example embodiment of how a SL data transmission between a transmitter Tx UE 310 and a receiver Rx UE 330 may be performed using SL-based UE-to-UE relay via a relay device R-UE 320. FIG. 3 is in particular an example for the case (1.1) from Table 1. For example, Tx UE 210 may be configured as Tx UE 310, R-UE 220 may be configured as R-UE 320 and/or Rx UE 230 may be configured as Rx UE 330.

FIG. 3 further shows an example embodiment of a method according to the first exemplary aspect and further shows an example embodiment of a method according to the second exemplary aspect. Further, transmitter Tx UE 310 may be an example embodiment for an apparatus according to the first exemplary aspect. Further, relay device R-UE 320 may be an example embodiment for an apparatus according to the second exemplary aspect.

The process illustrated in FIG. 3 may have some or all of the following steps:

Step 350: UE-to-UE relay is set up for Tx UE 310 to transmit data to Rx UE 330 over SL. In this example, R-UE 320 is set up as relay device for the SL from Tx UE 310 to Rx UE 330.

Step 351: Tx UE 310 initiates a HARQ process to transmit a TB.

Step 352: Tx UE 310 transmits a first HARQ transmission of the TB as groupcast using the ID of Rx UE as destination identifier. The transmission may reach R-UE and/or Rx UE. In or after this step, Tx UE 310 may further start monitoring for a receiver HARQ feedback and for a relay HARQ feedback on the HARQ transmission.

Step 353a: R-UE receives the TB successfully. Instead of sending a HARQ ACK to Tx, UE starts monitoring for a receiver HARQ feedback on the HARQ transmission from Rx UE.

Step 353b: Rx UE does not receive the HARQ transmission and therefore does not send a receiver HARQ feedback.

Step 354a: R-UE 320, which is monitoring for a receiver HARQ feedback on the HARQ transmission, does not receive any receiver HARQ feedback from Rx UE within a specified time period after receiving the TB in step 353a. The receiver HARQ feedback monitoring result is therefore indicative of HARQ DTX. Based on the obtained receiver HARQ feedback monitoring result, R-UE determines a relay decision. In this example, R-UE determines to relay ("Relay!") as the receiver HARQ feedback monitoring result is indicative of HARQ DTX.

Step 354b: Tx UE 310 is monitoring for a receiver HARQ feedback and for a relay HARQ feedback on the HARQ transmission. Because of steps 353a and 353b, Tx UE neither receives any receiver HARQ feedback from Rx UE nor any relay HARQ feedback from R-UE within a specified time period after the HARQ transmission in step 352. The receiver HARQ feedback monitoring result and the relay HARQ feedback monitoring result are therefore both indicative of HARQ DTX in this example. Based on the obtained receiver HARQ feedback monitoring result and the obtained relay HARQ feedback monitoring result, Tx UE 310 determines a retransmission decision. In this example, Tx UE determines not to transmit a retransmission ("No retransmission!") as both, the receiver HARQ feedback monitoring result and the relay HARQ feedback monitoring result, are indicative of HARQ DTX.

Step 355: Based on the relay decision, R-UE relays the TB. In this example, as the relay decision is "Relay!", R-UE relays the TB by transmitting a first HARQ transmission as unicast using the ID of Rx UE as destination identifier to Rx. The first HARQ transmission of R-UE to Rx UE may also reach Tx UE which may be monitoring for sidelink HARQ feedback from R-UE.

Step 356a: Rx UE receives the TB successfully.

Step 356b: In this example, the first HARQ transmission from R-UE to Rx UE has reached also Tx UE. As Tx UE is monitoring for sidelink HARQ feedback from R-UE, Tx UE receives at least the SCI from R-UE to Rx UE. Based on this sidelink HARQ feedback monitoring result, which in this example is reception of the SCI, Tx UE determines a termination decision on whether or not to terminate the HARQ process. In this example, Tx UE determines to terminate ("Termination!") since SCI was received. Accordingly, Tx UE terminates the HARQ process.

Step 357: Rx UE transmits HARQ ACK to R-UE which may also reach Tx UE. Thus, based on the received SCI in Step 356b, Tx UE may be able to monitor for sidelink HARQ feedback from Rx UE to R-UE. The monitoring result may be used for determining whether Rx UE is reachable to Tx UE or not.

Step 358: R-UE receives HARQ ACK from R-UE and terminates the HARQ process.

The dashed line in FIG. 3 is of the same transmission from the transmitter, Tx UE 310 in Step 352 and Rx UE 330 in Step 357.

The example shown in FIG. 3 encompasses an exemplary embodiment of the method according to the first exemplary aspect. Further, the transmitter Tx UE 310 may be or may be part of an apparatus according to the first aspect.

Tx UE 310, which may be a mobile device such as a cellular phone, comprises at least one processor and at least one memory including computer program code. The at least one memory and the computer program code are configured to, with the at least one processor, cause the Tx UE to at least perform the following:

transmitting, in step 352, at least one HARQ transmission of a sidelink transport block, the at least one HARQ transmission including a destination identifier information indicative of a destination identifier for a receiver, e.g. Rx UE 330, monitoring, e.g. from step 352 to step 354b, for a receiver HARQ feedback on the at least one HARQ transmission from the receiver, e.g. Rx UE 330, to obtain a receiver HARQ feedback monitoring result, e.g. indicative of HARQ DTX as in step 354b, monitoring, e.g. from step 352 to step 354b, for a relay HARQ feedback on the at least one HARQ transmission from a relay device, e.g. R-UE 320, to obtain a relay HARQ feedback monitoring result, e.g. indicative of HARQ DTX as in step 354b, and determining, e.g. in step 354b, as a function of the receiver HARQ feedback monitoring result and of the relay HARQ feedback monitoring result, a retransmission decision on whether or not to transmit at least one HARQ retransmission of the sidelink transport block, which retransmission decision in this example is, e.g., "No retransmission!".

The example shown in FIG. 3 further encompasses an exemplary embodiment of the method according to the second exemplary aspect. Further, the relay device R-UE 320 may be or may be part of an apparatus according to the second aspect.

R-UE 320, which may be a mobile device such as a cellular phone, comprises at least one processor and at least one memory including computer program code. The at least one memory and the computer program code are configured to, with the at least one processor, cause the R-UE to at least perform the following:

receiving, in step 353a, from a transmitter, e.g. Tx UE 310, at least one HARQ transmission of a sidelink transport block, the HARQ transmission including a destination identifier information indicative of a destination identifier for a receiver, e.g. Rx UE 330, and at least in the case that the HARQ transmission has been successfully received, as it is for example the case in step 353a, monitoring, e.g. from step 353a to 354a, for a receiver HARQ feedback on the HARQ transmission from the receiver, e.g. Rx UE 330, to obtain a receiver HARQ feedback monitoring result, e.g. indicative of a HARQ DTX as in step 354a, and determining, e.g. in step 354a, as a function of the receiver HARQ feedback monitoring result, a relay decision on whether or not to relay data of the at least HARQ transmission to the receiver, e.g. Rx UE 330, which relay decision in this example is, e.g., "Relay!".

FIG. 4 is a signaling chart 400 showing a further example embodiment of how a SL data transmission between a transmitter Tx UE 410 and a receiver Rx UE 430 is performed using SL-based UE-to-UE relay via a relay Rx UE 430. FIG. 4 is in particular an example for the case (1.3) from Table 1. For example, Tx UE 210 may be configured as Tx UE 410, R-UE 220 may be configured as R-UE 420 and/or Rx UE 230 may be configured as Rx UE 430.

The process illustrated in FIG. 4 may have some or all of the following steps:

Step 450: UE-to-UE relay is set up for Tx UE 410 to transmit data to Rx UE 420 over SL. (This step corresponds to step 350).

Step 451: This step corresponds to step 351.

Step 452: This step corresponds to step 352

Step 453a: This step corresponds to step 353a.

Step 453b: In this example, Rx UE receives the TB successfully.

Step 454: Rx UE sends HARQ ACK as receiver HARQ feedback as it has received the TB successfully in step 453b.

Step 455a: Tx UE 410 is monitoring for a receiver HARQ feedback and for a relay HARQ feedback on the HARQ transmission. According to steps 453a and 454, Tx-UE receives HARQ ACK as receiver HARQ feedback from Rx UE 430 and does not receive any relay HARQ feedback from R-UE 420 within a specified time period after the HARQ transmission in step 452. Therefore, the receiver HARQ feedback monitoring result is indicative of HARQ ACK and the relay HARQ feedback monitoring result is indicative of HARQ DTX in this example. Based on the obtained receiver HARQ feedback monitoring result and the obtained relay HARQ feedback monitoring result, Tx UE 410 determines a retransmission decision. In this example, Tx UE determines not to transmit a retransmission ("No retransmission!") as the receiver HARQ feedback monitoring result is indicative of HARQ ACK.

Step 455b: R-UE 420, which is monitoring for a receiver HARQ feedback on the HARQ transmission, receives the HARQ ACK feedback sent by Rx UE so that the receiver HARQ feedback monitoring result is indicative of HARQ ACK. Based on the obtained receiver HARQ feedback monitoring result, R-UE determines a relay decision. In this example, R-UE determines not to relay ("No relay!") as the receiver HARQ feedback monitoring result is indicative of HARQ ACK.

Step 456a: Tx UE determines a termination decision based on the receiver HARQ feedback monitoring result. In this example, Tx UE determines to terminate the HARQ process as the receiver HARQ feedback monitoring result is indicative of HARQ ACK Step 456b: Depending on the relay decision, R-UE terminates the HARQ process. Since, in this example, the relay decision is "No relay!", R-UE terminates the HARQ process.

Step 457: Tx UE 410 determines a releasing decision based on the receiver HARQ feedback monitoring result. In this example, Tx UE determines to release the relay device ("Releasing!") as the receiver HARQ feedback monitoring result is indicative of HARQ ACK which indicates that a return to direct SL is possible.

Step 458: Depending on the releasing decision, Tx UE releases relay device R-UE. In this example, Tx UE releases R-UE as the releasing decision is "Releasing!".

The dashed line in FIG. 4 is of the same transmission from the transmitter, Tx UE 310 in Step 352.

The example shown in FIG. 4 encompasses an exemplary embodiment of the method according to the first exemplary aspect. Further, the transmitter Tx UE 410 may be or may be part of an apparatus according to the first aspect.

Tx UE 410, which may be a mobile device such as a cellular phone, comprises at least one processor and at least one memory including computer program code. The at least one memory and the computer program code are configured to, with the at least one processor, cause the Tx UE to at least perform the following:

- transmitting, in step 452, at least one HARQ transmission of a sidelink transport block, the at least one HARQ transmission including a destination identifier information indicative of a destination identifier for a receiver, e.g. Rx UE 430,
- monitoring, e.g. from step 452 to step 455a, for a receiver HARQ feedback on the at least one HARQ transmission from the receiver, e.g. Rx UE 430, to obtain a receiver HARQ feedback monitoring result, e.g. indicative of HARQ ACK as in step 455a,
- monitoring, e.g. from step 452 to step 455a, for a relay HARQ feedback on the at least one HARQ transmission from a relay device, e.g. R-UE 420, to obtain a relay HARQ feedback monitoring result, e.g. indicative of HARQ DTX as in step 455b, and
- determining, e.g. in step 455a, as a function of the receiver HARQ feedback monitoring result and of the relay HARQ feedback monitoring result, a retransmission decision on whether or not to transmit at least one HARQ retransmission of the sidelink transport block, which retransmission decision in this example is, e.g., "No retransmission!".

The example shown in FIG. 4 further encompasses an exemplary embodiment of the method according to the second exemplary aspect. Further, the relay device R-UE 420 may be or may be part of an apparatus according to the second aspect.

R-UE 420, which may be a mobile device such as a cellular phone, comprises at least one processor and at least one memory including computer program code. The at least one memory and the computer program code are configured to, with the at least one processor, cause the R-UE to at least perform the following:

- receiving, in step 453a, from a transmitter, e.g. Tx UE 410, at least one HARQ transmission of a sidelink transport block, the HARQ transmission including a destination identifier information indicative of a destination identifier for a receiver, e.g. Rx UE 430, and at least in the case that the HARQ transmission has been successfully received, as it is for example the case in step 453a,
    - monitoring, e.g. from step 453a to 455b, for a receiver HARQ feedback on the HARQ transmission from the receiver, e.g. Rx UE 430, to obtain a receiver HARQ feedback monitoring result, e.g. indicative of a HARQ ACK as in step 455b, and
    - determining, e.g. in step 455b, as a function of the receiver HARQ feedback monitoring result, a relay decision on whether or not to relay data of the at least one HARQ transmission to the receiver, e.g. Rx UE 430, which relay decision in this example is, e.g., "No relay!".

FIG. 5 is a signaling chart 500 showing a further example embodiment of how a SL data transmission between a transmitter Tx UE 510 and a receiver Rx UE 520 is performed using SL-based UE-to-UE relay via a relay Rx UE 530. FIG. 5 is in particular an example for the case (2.1) from Table 1. For example, Tx UE 210 may be configured as Tx UE 510, R-UE 220 may be configured as R-UE 520 and/or Rx UE 230 may be configured as Rx UE 530.

The process illustrated in FIG. 5 may have some or all of the following steps:

Step 550: UE-to-UE relay is set up for Tx UE 510 to transmit data to Rx UE 530 over SL. (This step corresponds to step 350).

Step 551: This step corresponds to step 351.

Step 552: This step corresponds to step 352

Step 553a: R-UE 520 receives the 1st HARQ transmission sent by Tx UE 510 in step 552, but unsuccessfully (e.g. only in part or with errors). R-UE 520 may or may not start monitoring for a receiver HARQ feedback on the HARQ transmission from Rx UE.

Step 553b: Rx UE does not receive the 1st HARQ transmission and therefore does not send a receiver HARQ feedback.

Step 554: As the HARQ transmission was unsuccessfully received, R-UE 520 transmits a relay HARQ feedback indicative of a negative acknowledgment, e.g. HARQ NACK, to the transmitter Tx UE 510.

Step 555: Tx UE 510 is monitoring for a receiver HARQ feedback and for a relay HARQ feedback on the HARQ transmission. According to steps 553a and 553b, Tx-UE receives HARQ NACK as relay HARQ feedback from R-UE 520 and does not receive any receiver HARQ feedback from Rx UE 530 within a specified time period after the HARQ transmission in step 552. Therefore, the receiver HARQ feedback monitoring result is indicative of HARQ DTX and the relay HARQ feedback monitoring result is indicative of HARQ NACK in this example. Based on the obtained receiver HARQ feedback monitoring result and the obtained relay HARQ feedback monitoring result, Tx UE 510 determines a retransmission decision. In this example, Tx UE determines to transmit a retransmission ("Retransmission!") as the receiver HARQ feedback monitoring result is indicative of HARQ DTX (so that relay is desirable) and as the relay HARQ feedback monitoring result is indicative of HARQ NACK (i.e. R-UE 520 needs retransmission for performing relay).

Step 556: Tx transmits a 2nd HARQ transmission of the TB (i.e. a HARQ retransmission), but this time as unicast using the ID of R-UE 520 as the destination identifier.

Step 557: R-UE 520 receives the 2nd HARQ transmission (i.e. the HARQ retransmission) and thus the TB successfully.

Step 558: R-UE sends HARQ ACK to Tx UE to acknowledge successful reception of the HARQ retransmission.

Step 559: Tx UE receives the HARQ ACK from R-UE and based on that determines to terminate the HARQ process ("Termination!"). Accordingly, Tx UE then terminates the HARQ process.

Step 560: As R-UE received the TB on a HARQ retransmission from Tx UE (the 2nd HARQ transmission in this example), R-UE determines to relay the TB to Rx UE ("Relay!"). Accordingly, R-UE relays the received TB as such or data inside the TB flexibly to Rx UE.

The dashed line in FIG. 5 is of the same transmission from the transmitter, Tx UE 310 in Step 352.

The example shown in FIG. 5 encompasses an exemplary embodiment of the method according to the first exemplary aspect. Further, the transmitter Tx UE 510 may be or may be part of an apparatus according to the first aspect.

Tx UE 510, which may be a mobile device such as a cellular phone, comprises at least one processor and at least one memory including computer program code. The at least one memory and the computer program code are configured to, with the at least one processor, cause the Tx UE to at least perform the following:

transmitting, in step 552, at least one HARQ transmission of a sidelink transport block, the at least one HARQ transmission including a destination identifier information indicative of a destination identifier for a receiver, e.g. Rx UE 530, monitoring, e.g. from step 552 to step 555, for a receiver HARQ feedback on the at least one HARQ transmission from the receiver, e.g. Rx UE 530, to obtain a receiver HARQ feedback monitoring result, e.g. indicative of HARQ DTX as in step 355, monitoring, e.g. from step 552 to step 555, for a relay HARQ feedback on the at least one HARQ transmission from a relay device, e.g. R-UE 520, to obtain a relay HARQ feedback monitoring result, e.g. indicative of HARQ NACK as in step 555, and determining, e.g. in step 555, as a function of the receiver HARQ feedback monitoring result and of the relay HARQ feedback monitoring result, a retransmission decision on whether or not to transmit at least one HARQ retransmission of the sidelink transport block, which retransmission decision in this example is, e.g., "Retransmission!", accordingly, Tx UE 510 transmits the HARQ retransmission in step 556.

The example shown in FIG. 5 further encompasses an exemplary embodiment of the method according to the second exemplary aspect. Further, the relay device R-UE 520 may be or may be part of an apparatus according to the second aspect.

R-UE 520, which may be a mobile device such as a cellular phone, comprises at least one processor and at least one memory including computer program code. The at least one memory and the computer program code are configured to, with the at least one processor, cause the R-UE to at least perform the following:

receiving, in step 553a, from a transmitter, e.g. Tx UE 510, at least one HARQ transmission of a sidelink transport block, the HARQ transmission including a destination identifier information indicative of a destination identifier for a receiver, e.g. Rx UE 530, transmitting, in step 554, to the transmitter, e.g. Tx UE 510, a relay HARQ feedback indicative of a negative acknowledgement, e.g. HARQ NACK, if the at least one HARQ transmission was unsuccessfully received, which in this example is the case in step 553a, after transmission of the relay HARQ feedback message indicative of the negative acknowledgement information in step 554, receiving, in step 557, from the transmitter, e.g. Tx UE 520, at least one HARQ retransmission of the sidelink transport block, in FIG. 5 referred to as "2nd HARQ transmission", and relaying, in step 560, data of the at least one HARQ retransmission to the receiver, e.g. Rx UE 530.

In another example, the Tx UE, may transmit more than one consecutive HARQ (re-) transmissions including the first HARQ transmission of the TB using the enhanced SL HARQ Opt-2 for the options (1.1) and (1.2) in Table 1 for reassuring purpose (that R-UE is expected to receive the TB successfully).

That is, Tx UE detects/receives DTX from R-UE and NACK/DTX from Rx UE for all these HARQ (re-) transmissions before terminating the HARQ process.

In another example, Tx UE may monitor at least SCI sent by R-UE to Rx UE, the SCI is used by R-UE to schedule a data transmission to Rx UE, for reassuring purpose that R-UE is receiving and relaying data from Tx UE to Rx UE. This monitoring is also for enabling Tx UE to monitor for HARQ feedback from Rx UE to R-UE, as described in the next example This monitoring may be used for Tx UE to determine whether to terminate the HARQ process or not for the options (1.1) and (1.2) in Table 1.

In another example, Tx UE may monitor SL HARQ feedback from Rx UE to R-UE while R-UE is relaying data to Rx UE using the unicast SL HARQ, provided that Tx UE receives the at least SCI in the previous example and derives the PSFCH resource which is used by Rx UE to send SL HARQ feedback to R-UE.

This monitoring is for determining whether Rx UE becomes reachable to Tx UE directly or not and therefore whether the relay is still needed or not.

It is noted that this kind of monitoring may also be applied to R-UE, as proposed in Step 1b of the HARQ scheme described above in connection with FIG. 2. However, the purpose thereof is different: R-UE monitors SL HARQ feedback from Rx UE to Tx UE in order to decide whether SL data in the scheduled TB or the scheduled TB as such needs to be relayed to Rx UE or not.

In another example, Tx UE may release the relayed connection and R-UE when Rx UE becomes reachable directly and properly to Tx UE based on monitoring SL HARQ feedback from Rx UE, as sent by Rx UE to either Tx UE or R-UE.

In another example, Tx UE may either use ID of R-UE or keep using ID of Rx UE or to alternate between them flexibly as DST ID for sending data to R-UE and/or both R-UE and Rx UE even when the direct SL is currently suffering from RLF.

In another example, Tx UE may determine which ID of R-UE and Rx UE is used as DST ID for SL transmission based on, e.g., whether the relay is for SL dual-connectivity (for duplication or split of SL data from Tx UE to Rx UE) or for SL RLF recovery, or for power saving of Tx UE; whether the relay is visible or invisible to Rx UE (ID of either Tx UE or R-UE may be used as SRC ID by R-UE to relay data to Rx UE in the visible relay and ID of Tx UE is used as SRC ID by R-UE in the invisible relay).

In another example, Tx UE may keep maintaining and using the SL radio-bearer (RB) contexts of the direct SL between Tx UE and Rx UE in the relay mode via R-UE even when the direct SL is currently suffering from RLF. This may imply that R-UE may preserve all SL RB contexts of the direct SL mode received from Tx UE and use that as such or with 1:1 mapping to relay corresponding data to Rx UE if needed (for the invisible relay for example). The current SL PDCP duplication detection may be reused as such at Rx UE, as Rx UE may receive same PDCP PDU from both R-UE and Tx UE on both the relayed and direct connections.

In another example, relaying a TB from R-UE to Rx UE may use either the same or the different HARQ process than the original transmission from Tx UE.

In case the relayed TB uses a different HARQ process, Rx UE may only use the receptions from R-UE to decode.

In the other case if the relayed TB uses the same HARQ process, Rx UE may use the receptions from both R-UE and Tx UE to decode. In this case, Tx UE may start/pause its transmission for a new TB, e.g. upon receiving an indication from the R-UE regarding whether the previous TB using the same HARQ process is acknowledged by Rx UE or not.

In another example, the UE-to-UE relay setup procedure may include the configuration of the proposed enhanced groupcast procedure. Thus, R-UE can be aware of the groupcast transmission by using the ID of Rx UE as the DST ID for the groupcast, for example. In addition, R-UE can also be aware of its dedicated PSFCH resource, if it needs to send NACK back to Tx UE.

Figure 6:
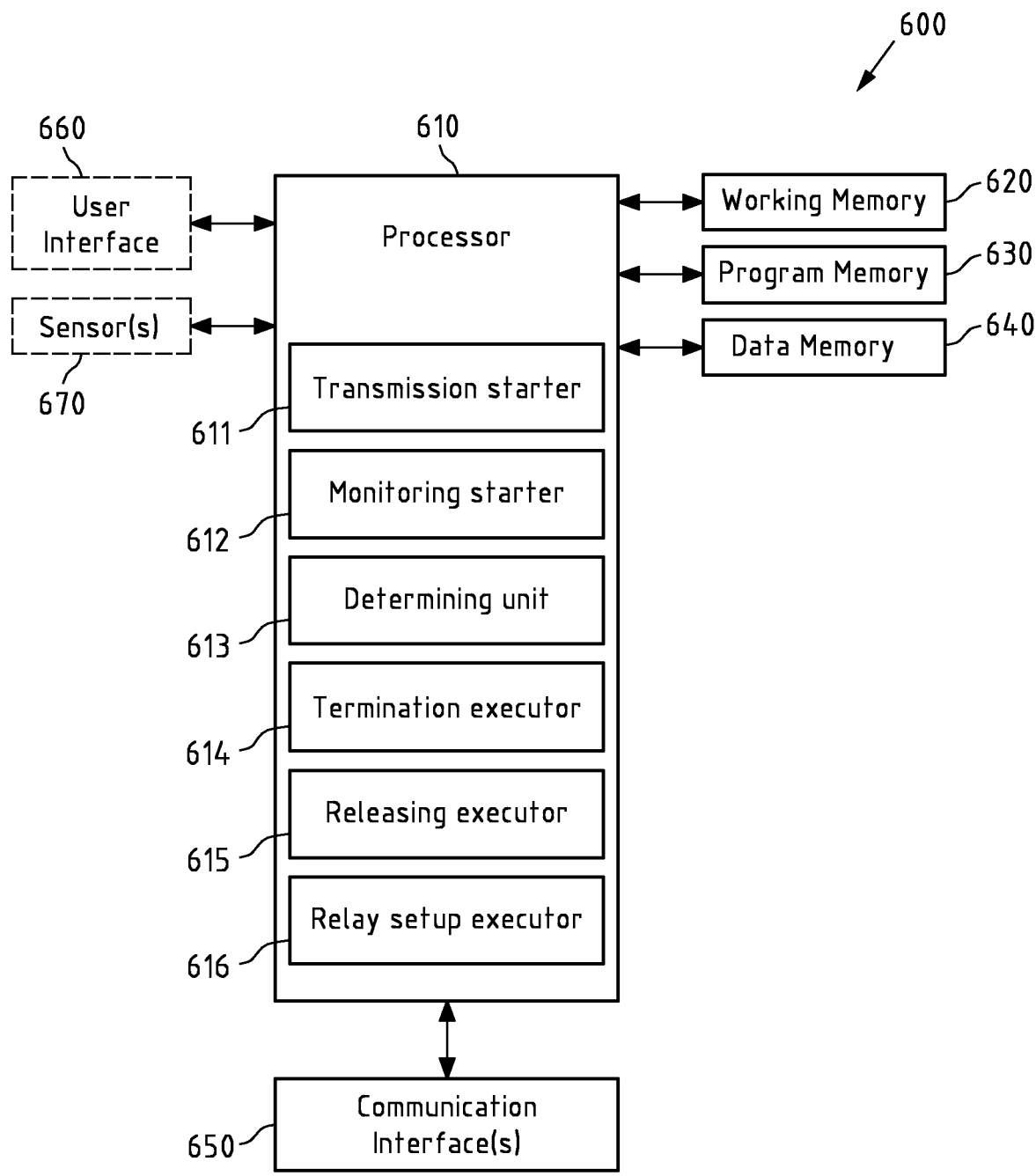
FIG. 6 a schematic block diagram of an apparatus configured to perform the method according to the first exemplary aspect.

FIG. 6 is a schematic block diagram of an apparatus 600 according to an exemplary aspect of the present invention, which may for instance represent Tx UE 210 of FIG. 2.

Apparatus 600 comprises a processor 610, working memory 620, program memory 630, data memory 640, communication interface(s) 650, an optional user interface 660 and an optional sensor(s) 670.

Apparatus 600 may for instance be configured to perform and/or control or comprise respective means (at least one of 610 to 670) for performing and/or controlling the method according to the first exemplary aspect. Apparatus 600 may as well constitute an apparatus comprising at least one processor (610) and at least one memory (620) including computer program code, the at least one memory and the computer program code configured to, with the at least one processor, cause an apparatus, e.g. apparatus 600 at least to perform and/or control the method according to the first exemplary aspect.

Processor 610 may for instance comprise a transmission starter 611 as functional and/or structural unit. Transmission starter 611 may for instance be configured to start transmission of a message, e.g. of a HARQ transmission, of a HARQ retransmission or of a HARQ feedback, to name but a few non-limiting examples. Transmission starter 611 may for instance be configured to start transmission of a message as unicast or groupcast.

Processor 610 may for instance comprise a monitoring starter 612 as functional and/or structural unit. Monitoring starter 612 may for instance be configured to start monitoring for messages, e.g. for a HARQ transmission, for a HARQ feedback such as a receiver HARQ feedback or a relay HARQ feedback, or for absence of messages, e.g. for a HARQ transmission or for a HARQ feedback, e.g. within a specified time period.

Processor 610 may for instance comprise a determining unit 613 as functional and/or structural unit. Determining unit 613 may for instance be configured to determine a decision, e.g. a retransmission decision, a relay decision, a termination decision or a releasing decision, to name but a few non-limiting examples, as a function of information, e.g. of a HARQ feedback monitoring result such as a receiver HARQ feedback monitoring result and/or relay a HARQ feedback monitoring result, to name but a few non-limiting examples.

Processor 610 may for instance comprise a termination executor 614 as functional and/or structural unit. Termination executor 614 may for instance be configured to execute termination of a process, e.g. a HARQ process.

Processor 610 may for instance comprise a releasing executor 615 as functional and/or structural unit. Releasing executor 615 may for instance be configured to execute releasing of a relay connection or device.

Processor 610 may for instance comprise a relay setup executor 616 as functional and/or structural unit. Relay setup executor 616 may for instance be configured to execute a relay setup procedure for setting up a relay device.

Processor 610 may for instance further control the memories 620 to 640, the communication interface(s) 650, the optional user interface 660 and the optional sensor(s) 670.

Processor 610 may for instance execute computer program code stored in program memory 630, which may for instance represent a computer readable storage medium comprising program code that, when executed by processor 610, causes the processor 610 to perform the method according to the first exemplary aspect.

Processor 610 (and also any other processor mentioned in this specification) may be a processor of any suitable type. Processor 610 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 610 may for instance be an application processor that runs an operating system.

Program memory 630 may also be included into processor 610. This memory may for instance be fixedly connected to processor 610, or be at least partially removable from processor 610, for instance in the form of a memory card or stick. Program memory 630 may for instance be non-volatile memory.

It may for instance be a FLASH memory (or a part thereof), any of a ROM, PROM, EPROM and EEPROM memory (or a part thereof) or a hard disc (or a part thereof), to name but a few examples. Program memory 630 may also comprise an operating system for processor 610. Program memory 630 may also comprise a firmware for apparatus 600.

Apparatus 600 comprises a working memory 620, for instance in the form of a volatile memory. It may for instance be a Random Access Memory (RAM) or Dynamic RAM (DRAM), to give but a few non-limiting examples. It may for instance be used by processor 610 when executing an operating system and/or computer program.

Data memory 640 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store measurement configuration information, handover configuration information, RRC configuration, CPA configuration information, or a combination thereof, to name but a few non-limiting examples.

Communication interface(s) 650 enable apparatus 600 to communicate with other entities, e.g. with R-UE 220 and Rx UE 230 of FIG. 2. The communication interface(s) 650 may for instance comprise a wireless interface, e.g. a cellular radio communication interface and/or a WLAN interface) and/or wire-bound interface, e.g. an IP-based interface, for instance to communicate with entities via the Internet.

Communication interface(s) may enable apparatus 600 to communicate with other entities not shown in FIG. 2.

User interface 660 is optional and may comprise a display for displaying information to a user and/or an input device (e.g. a keyboard, keypad, touchpad, mouse, etc.) for receiving information from a user.

Sensor(s) 670 are optional and may for instance comprise a barometric sensor, e.g. to gather pressure information.

Some or all of the components of the apparatus 600 may for instance be connected via a bus. Some or all of the components of the apparatus 600 may for instance be combined into one or more modules.

Figure 7:
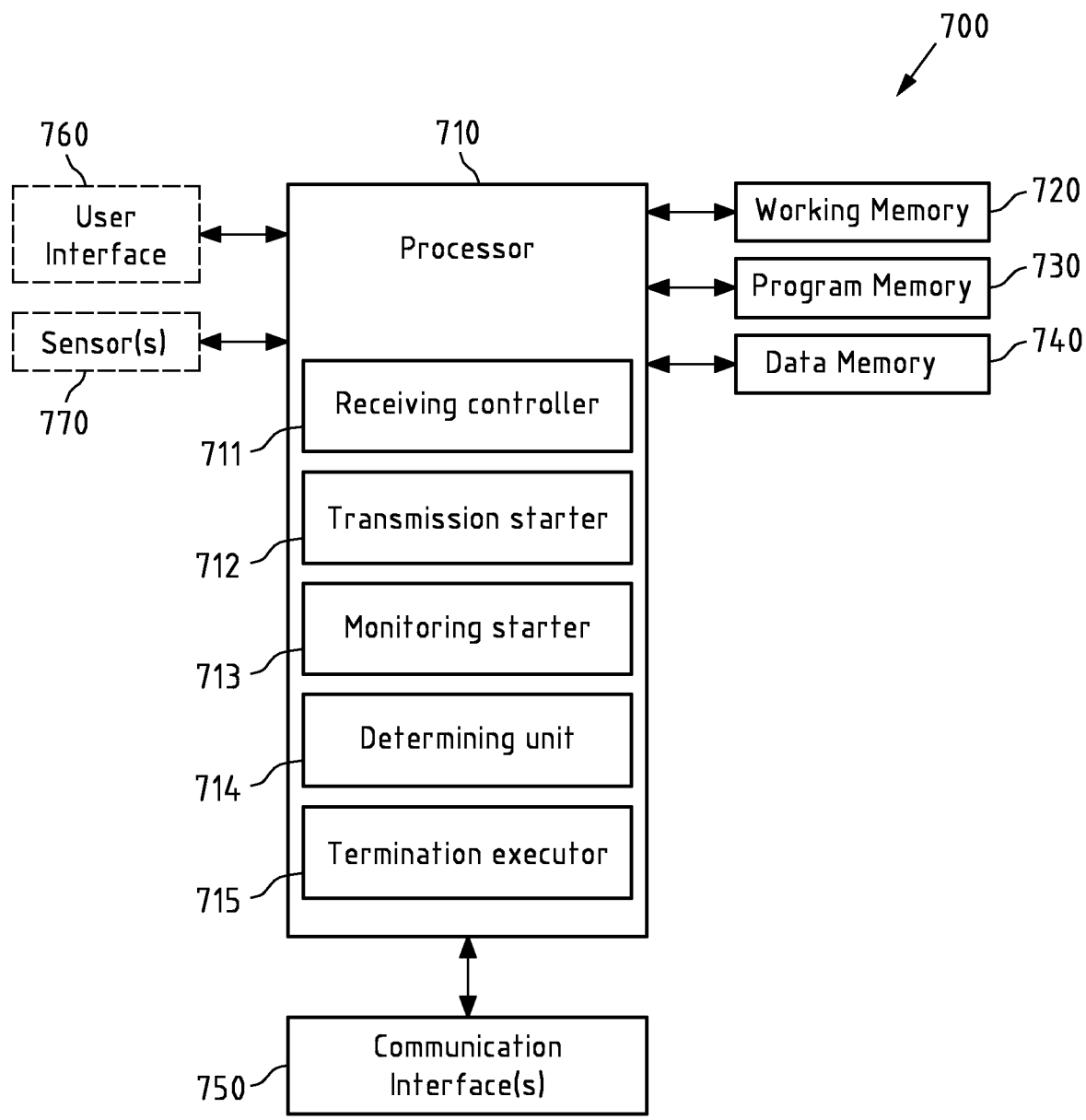
FIG. 7 a schematic block diagram of an apparatus configured to perform the method according to the second exemplary aspect.

FIG. 7 is a schematic block diagram of an apparatus 700 according to an exemplary aspect of the present invention, which may for instance represent R-UE 220 in FIG. 2.

Apparatus 700 comprises a processor 710, working memory 720, program memory 730, data memory 740, communication interface(s) 750, an optional user interface 760 and an optional sensor(s) 770.

Apparatus 700 may for instance be configured to perform and/or control or comprise respective means (at least one of 710 to 770) for performing and/or controlling the method according to the second exemplary aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to the second exemplary aspect.

Processor 710 may for instance comprise a receiving controller 711 as functional and/or structural unit. Receiving controller 711 may for instance be configured to control reception of a message, e.g. of a HARQ transmission, of a HARQ retransmission or of a HARQ feedback, to name but a few non-limiting examples.

Processor 710 may for instance comprise a transmission starter 712 as functional and/or structural unit. Transmission starter 711 may for instance be configured to start transmission of a message, e.g. of a HARQ transmission, of a HARQ retransmission or of a HARQ feedback, to name but a few non-limiting examples. Transmission starter 711 may for instance be configured to start transmission of a message as unicast or groupcast.

Processor 710 may for instance comprise a monitoring starter 713 as functional and/or structural unit. Monitoring starter 713 may for instance be configured to start monitoring for messages, e.g. for a HARQ transmission, for a HARQ feedback such as a receiver HARQ feedback or a relay HARQ feedback, or for absence of messages, e.g. for a HARQ transmission or for a HARQ feedback, e.g. within a specified time period.

Processor 710 may for instance comprise a determining unit 714 as functional and/or structural unit. Determining unit 714 may for instance be configured to determine a decision, e.g. a retransmission decision, a relay decision, a termination decision or a releasing decision, to name but a few non-limiting examples, as a function of information, e.g. of a HARQ feedback monitoring result such as a receiver HARQ feedback monitoring result and/or relay a HARQ feedback monitoring result, to name but a few non-limiting examples.

Processor 710 may for instance comprise a termination executor 715 as functional and/or structural unit. Termination executor 715 may for instance be configured to execute termination of a process, e.g. a HARQ process.

Processor 710 may for instance further control the memories 720 to 740, the communication interface(s) 750, the optional user interface 760 and the optional sensor(s) 770.

Processor 710 may for instance execute computer program code stored in program memory 730, which may for instance represent a computer readable storage medium comprising program code that, when executed by processor 710, causes the processor 710 to perform the method according to the second exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory.

It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 640 may for instance store measurement configuration information, handover configuration information, RRC configuration, CPA configuration information, or a combination thereof, to name but a few non-limiting examples.

Communication interface(s) 750 enable apparatus 700 to communicate with other entities, e.g. with Tx UE 210 or with Rx UE 230 of FIG. 2. The communication interface(s) 750 may for instance comprise a wireless interface, e.g. a cellular radio communication interface and/or a WLAN interface) and/or wire-bound interface, e.g. an IP-based interface, for instance to communicate with entities via the Internet.

Communication interface(s) may enable apparatus 700 to communicate with other entities not shown in FIG. 2.

User interface 760 is optional and may comprise a display for displaying information to a user and/or an input device (e.g. a keyboard, keypad, touchpad, mouse, etc.) for receiving information from a user.

Some or all of the components of the apparatus 700 may for instance be connected via a bus. Some or all of the components of the apparatus 700 may for instance be combined into one or more modules.

The following embodiments shall also be considered to be disclosed:

EMBODIMENT A1

An apparatus comprising at least one processor and at least one memory including computer program code, the at least one memory and the computer program code configured to, with the at least one processor, cause the apparatus to at least perform:
- transmitting at least one HARQ transmission of a sidelink transport block, the at least one HARQ transmission including a destination identifier information indicative of a destination identifier for a receiver, monitoring for a receiver HARQ feedback on the at least one HARQ transmission from the receiver to obtain a receiver HARQ feedback monitoring result,
monitoring for a relay HARQ feedback on the at least one HARQ transmission from a relay device to obtain a relay HARQ feedback monitoring result, and
determining, as a function of the receiver HARQ feedback monitoring result and on the relay HARQ feedback monitoring result, a retransmission decision on whether or not to transmit at least one HARQ retransmission of the sidelink transport block.

EMBODIMENT A2

The apparatus according to embodiment A1, wherein the at least one memory and the computer program code configured to, with the at least one processor, cause the apparatus further to perform:
depending on the retransmission decision, transmitting the at least one HARQ retransmission.

EMBODIMENT A3

The apparatus according to embodiment A1 or A2, wherein:
the HARQ retransmission includes a destination identifier information indicative of a destination identifier for the relay device.

EMBODIMENT A4

The apparatus according to any one of embodiments A1 to A3, wherein:
determining the retransmission decision includes:
determining to retransmit the at least one HARQ retransmission at least in the case that the receiver HARQ feedback monitoring result is indicative of a discontinuous transmission, e.g. HARQ DTX, and the relay HARQ feedback monitoring result is indicative of a negative acknowledgement, e.g. HARQ NACK.

EMBODIMENT A5

The apparatus according to any one of embodiments A1 to A4, wherein:
transmitting the at least one HARQ transmission includes:
transmitting the at least one HARQ transmission as groupcast sidelink HARQ transmission.

EMBODIMENT A6

The apparatus according to any one of embodiments A1 to A5, wherein:
transmitting the at least one HARQ retransmission includes:
transmitting the at least one HARQ retransmission as unicast sidelink HARQ (re) transmission.

EMBODIMENT A7

The apparatus according to any one of embodiments A1 to A6, wherein:
determining the retransmission decision includes:
determining to transmit the at least one HARQ retransmission in the case that the receiver HARQ feedback monitoring result and the relay HARQ feedback monitoring result are each indicative of a negative acknowledgement, e.g. HARQ NACK.

EMBODIMENT A8

The apparatus according to any one of embodiments A1 to A7, wherein:
determining the retransmission decision includes:
determining not to transmit the at least one HARQ retransmission in the case that the receiver HARQ feedback monitoring result and the relay HARQ feedback monitoring result are each indicative of a discontinuous transmission, e.g. HARQ DTX.

EMBODIMENT A9

The apparatus according to any one of embodiments A1 to A8, wherein the at least one memory and the computer program code configured to, with the at least one processor, cause the apparatus further to perform:
terminating the HARQ process in the case that the receiver HARQ feedback monitoring result and the relay HARQ feedback monitoring result are each indicative of a discontinuous transmission, e.g. HARQ DTX.

EMBODIMENT A10

The apparatus according to any one of embodiments A1 to A9, wherein
determining the retransmission decision includes:
determining not to transmit the at least one HARQ retransmission in the case that the receiver HARQ feedback monitoring result is indicative of a negative acknowledgement, e.g. HARQ NACK, and the relay HARQ feedback monitoring result is indicative of a discontinuous transmission, e.g. HARQ DTX.

EMBODIMENT A11

The apparatus according to any one of embodiments A1 to A10, wherein the at least one memory and the computer program code configured to, with the at least one processor, cause the apparatus further to perform:
terminating the HARQ process in the case that the receiver HARQ feedback monitoring result is indicative of a negative acknowledgement, e.g. HARQ NACK, and the relay HARQ feedback monitoring result is indicative of a discontinuous transmission, e.g. HARQ DTX.

EMBODIMENT A12

The apparatus according to any one of embodiments A1 to A11, wherein
determining the retransmission decision includes:
determining not to transmit the at least one HARQ retransmission in the case that the receiver HARQ feedback monitoring result is indicative of a positive acknowledgement, e.g. HARQ ACK.

EMBODIMENT A13

The apparatus according to any one of embodiments A1 to A12, wherein the at least one memory and the computer program code configured to, with the at least one processor, cause the apparatus further to perform:

terminating the HARQ process in the case that the receiver HARQ feedback monitoring result is indicative of a positive acknowledgment, e.g. HARQ ACK.

EMBODIMENT A14

The apparatus according to any one of embodiments A8 to A13, wherein the at least one memory and the computer program code configured to, with the at least one processor, cause the apparatus further to perform:
  releasing the relay device.

EMBODIMENT A15

The apparatus according to any one of embodiments A1 to A14, wherein the at least one memory and the computer program code configured to, with the at least one processor, cause the apparatus further to perform:
  transmitting more than one consecutive HARQ transmissions of the sidelink transport block,
    monitoring for respective receiver HARQ feedbacks on the respective HARQ transmissions from the receiver to obtain respective receiver HARQ feedback monitoring results and
    monitoring for respective relay HARQ feedbacks on the respective HARQ transmissions from the relay device to obtain respective relay HARQ feedback monitoring results,
    determining, as a function of the respective receiver HARQ feedback monitoring results and on the respective relay HARQ feedback monitoring result, a respective retransmission decision on whether or not to transmit at least one respective HARQ retransmission of the sidelink transport block.

EMBODIMENT A16

The apparatus according to any one of embodiments A1 to A15, wherein the at least one memory and the computer program code configured to, with the at least one processor, cause the apparatus further to perform:
  monitoring for a message including sidelink control information (SCI) from the relay device to the receiver to obtain an SCI monitoring result, and,
  optionally, determining a termination decision on whether or not to terminate HARQ process as a function of the SCI monitoring result.

EMBODIMENT A17

The apparatus according to any one of embodiments A1 to A16, wherein the at least one memory and the computer program code configured to, with the at least one processor, cause the apparatus further to perform:
  monitoring for a sidelink HARQ feedback from the receiver to the relay to obtain an SL HARQ feedback monitoring result, and
  optionally, determining a releasing decision on whether or not to release the relay as a function of the SL HARQ feedback monitoring result.

EMBODIMENT A18

The apparatus according to any one of embodiments A1 to A17, wherein the at least one memory and the computer program code configured to, with the at least one processor, cause the apparatus further to perform:
  monitoring for a sidelink HARQ feedback from the receiver to the transmitter or to the relay device to obtain an SL HARQ feedback monitoring result, and depending on the SL HARQ feedback monitoring result, releasing of the relay device.

EMBODIMENT A19

The apparatus according to any one of embodiments A1 to A18, wherein the at least one memory and the computer program code configured to, with the at least one processor, cause the apparatus further to perform:
  executing a relay setup procedure for setting up the relay device.

EMBODIMENT A20

The apparatus according to any one of embodiments A1 to A19, wherein the apparatus is or is part of a mobile device and/or an Internet-of-Things, IoT device.

EMBODIMENT A21

The apparatus according to any one of embodiments A1 to A20, wherein the at least one HARQ transmission of the sidelink transport block is a first HARQ transmission of the sidelink transport block.

EMBODIMENT A22

The apparatus according to embodiment A15, wherein the more than one consecutive HARQ transmissions of the sidelink transport block include the first HARQ transmission of the sidelink transport block.

EMBODIMENT A23

An apparatus comprising at least one processor and at least one memory including computer program code, the at least one memory and the computer program code configured to, with the at least one processor, cause the apparatus to at least perform:
  receiving from a transmitter at least one HARQ transmission of a sidelink transport block, the HARQ transmission including a destination identifier information indicative of a destination identifier for a receiver, and
  at least in the case that the at least one HARQ transmission has been successfully received,
    monitoring for a receiver HARQ feedback on the at least one HARQ transmission from the receiver to obtain a receiver HARQ feedback monitoring result, and
    determining, as a function of the receiver HARQ feedback monitoring result, a relay decision on whether or not to relay data of the at least one HARQ transmission to the receiver.

EMBODIMENT A24

The apparatus according to claim A23, wherein
determining the relay decision includes:
  determining to relay data of the at least one HARQ transmission to the receiver if the receiver HARQ feedback monitoring result is indicative of a discontinuous transmission, e.g. HARQ DTX.

EMBODIMENT A25

The apparatus according to claim A23 or A24, wherein determining the relay decision includes:

determining to relay data of the at least one HARQ transmission to the receiver if the receiver HARQ feedback monitoring result is indicative of a negative acknowledgement, e.g. HARQ NACK.

EMBODIMENT A26

The apparatus according to any one of embodiments A23 to A25 wherein the at least one memory and the computer program code configured to, with the at least one processor, cause the apparatus further to perform:
transmitting to the transmitter a relay HARQ feedback indicative of a negative acknowledgement, e.g. HARQ NACK, if the at least one HARQ transmission was unsuccessfully received.

EMBODIMENT A27

The apparatus according to embodiment A26, wherein the at least one memory and the computer program code configured to, with the at least one processor, cause the apparatus further to perform:
after transmission of the relay HARQ feedback message indicative of the negative acknowledgement information, receiving from the transmitter at least one HARQ retransmission of the sidelink transport block.

EMBODIMENT A28

The apparatus according to any one of embodiments A23 to A27, wherein the at least one memory and the computer program code configured to, with the at least one processor, cause the apparatus further to perform:
if the at least one HARQ transmission has been successfully received, skipping transmission of a relay HARQ feedback indicative of a positive acknowledgment, e.g. HARQ ACK, to the transmitter.

EMBODIMENT A29

The apparatus according to any one of embodiments A23 to A28, wherein the at least one memory and the computer program code configured to, with the at least one processor, cause the apparatus further to perform:
depending on the relay decision, relaying data of the at least one HARQ transmission or HARQ retransmission to the receiver.

EMBODIMENT A30

The apparatus according to any one of embodiments A23 to A29, wherein the at least one memory and the computer program code configured to, with the at least one processor, cause the apparatus further to perform:
monitoring for a sidelink HARQ feedback on the relayed data from the receiver to obtain a sidelink HARQ feedback monitoring result.

EMBODIMENT A31

The apparatus according to any one of embodiments A23 to A30, wherein the at least one HARQ transmission of the sidelink transport block is a first HARQ transmission of the sidelink transport block.

EMBODIMENT A32

The apparatus according to any one of embodiments A23 to A31, wherein the apparatus is or is part of a mobile device and/or an Internet-of-Things, IoT device.

EMBODIMENT A33

A system, comprising:
at least one apparatus according to any of the embodiments A1 to A22; and
at least one apparatus according to any of the embodiments A23 to A32.

EMBODIMENT M1

A method comprising:
transmitting at least one HARQ transmission of a sidelink transport block, the at least one HARQ transmission including a destination identifier information indicative of a destination identifier for a receiver,
monitoring for a receiver HARQ feedback on the at least one HARQ transmission from the receiver to obtain a receiver HARQ feedback monitoring result,
monitoring for a relay HARQ feedback on the at least one HARQ transmission from a relay device to obtain a relay HARQ feedback monitoring result, and
determining, as a function of the receiver HARQ feedback monitoring result and on the relay HARQ feedback monitoring result, a retransmission decision on whether or not to transmit at least one HARQ retransmission of the sidelink transport block.

EMBODIMENT M2

The method according to embodiment M1, further comprising:
depending on the retransmission decision, transmitting the at least one HARQ retransmission.

EMBODIMENT M3

The method according to embodiment M1 or M2, wherein:
the HARQ retransmission includes a destination identifier information indicative of a destination identifier for the relay device.

EMBODIMENT M4

The method according to any one of embodiments M1 to M3, wherein:
determining the retransmission decision includes:
determining to retransmit the at least one HARQ retransmission at least in the case that the receiver HARQ feedback monitoring result is indicative of a discontinuous transmission, e.g. HARQ DTX, and the relay HARQ feedback monitoring result is indicative of a negative acknowledgement, e.g. HARQ NACK.

EMBODIMENT M5

The method according to any one of embodiments M1 to M4, wherein:
transmitting the at least one HARQ transmission includes:

transmitting the at least one HARQ transmission as groupcast sidelink HARQ transmission.

EMBODIMENT M6

The method according to any one of embodiments M1 to M5, wherein:
transmitting the at least one HARQ retransmission includes:
transmitting the at least one HARQ retransmission as unicast sidelink HARQ (re) transmission.

EMBODIMENT M7

The method according to any one of embodiments M1 to M6, wherein:
determining the retransmission decision includes:
determining to transmit the at least one HARQ retransmission in the case that the receiver HARQ feedback monitoring result and the relay HARQ feedback monitoring result are each indicative of a negative acknowledgement, e.g. HARQ NACK.

EMBODIMENT M8

The method according to any one of embodiments M1 to M7, wherein:
determining the retransmission decision includes:
determining not to transmit the at least one HARQ retransmission in the case that the receiver HARQ feedback monitoring result and the relay HARQ feedback monitoring result are each indicative of a discontinuous transmission, e.g. HARQ DTX.

EMBODIMENT M9

The method according to any one of embodiments M1 to M8, further comprising:
terminating the HARQ process in the case that the receiver HARQ feedback monitoring result and the relay HARQ feedback monitoring result are each indicative of a discontinuous transmission, e.g. HARQ DTX.

EMBODIMENT M10

The method according to any one of embodiments M1 to M9, wherein
determining the retransmission decision includes:
determining not to transmit the at least one HARQ retransmission in the case that the receiver HARQ feedback monitoring result is indicative of a negative acknowledgement, e.g. HARQ NACK, and the relay HARQ feedback monitoring result is indicative of a discontinuous transmission, e.g. HARQ DTX.

EMBODIMENT M11

The method according to any one of embodiments M1 to M10, further comprising:
terminating the HARQ process in the case that the receiver HARQ feedback monitoring result is indicative of a negative acknowledgement, e.g. HARQ NACK, and the relay HARQ feedback monitoring result is indicative of a discontinuous transmission, e.g. HARQ DTX.

EMBODIMENT M12

The method according to any one of embodiments M1 to M11, wherein
determining the retransmission decision includes:
determining not to transmit the at least one HARQ retransmission in the case that the receiver HARQ feedback monitoring result is indicative of a positive acknowledgement, e.g. HARQ ACK.

EMBODIMENT M13

The method according to any one of embodiments M1 to M12, further comprising:
terminating the HARQ process in the case that the receiver HARQ feedback monitoring result is indicative of a positive acknowledgment, e.g. HARQ ACK.

EMBODIMENT M14

The method according to any one of embodiments M8 to M13, further comprising:
releasing the relay.

EMBODIMENT M15

The method according to any one of embodiments M1 to M14, further comprising:
transmitting more than one consecutive HARQ transmissions of the sidelink transport block,
monitoring for respective receiver HARQ feedbacks on the respective HARQ transmissions from the receiver to obtain respective receiver HARQ feedback monitoring results and
monitoring for respective relay HARQ feedbacks on the respective HARQ transmissions from the relay device to obtain respective relay HARQ feedback monitoring results,
determining, as a function of the respective receiver HARQ feedback monitoring results and on the respective relay HARQ feedback monitoring result, a respective retransmission decision on whether or not to transmit at least one respective HARQ retransmission of the sidelink transport block.

EMBODIMENT M16

The method according to any one of embodiments M1 to M15, further comprising:
monitoring for a message including sidelink control information (SCI) from the relay device to the receiver to obtain an SCI monitoring result, and,
optionally, determining a termination decision on whether or not to terminate HARQ process as a function of the SCI monitoring result.

EMBODIMENT M17

The method according to any one of embodiments M1 to M16, further comprising:
monitoring for a sidelink HARQ feedback from the receiver to the relay to obtain an SL HARQ feedback monitoring result, and
optionally, determining a releasing decision on whether or not to release the relay as a function of the SL HARQ feedback monitoring result.

EMBODIMENT M18

The method according to any one of embodiments M1 to M17, further comprising:
monitoring for a sidelink HARQ feedback from the receiver to the transmitter or to the relay device to obtain an SL HARQ feedback monitoring result, and depending on the SL HARQ feedback monitoring result, releasing of the relay device.

EMBODIMENT M19

The method according to any one of embodiments M1 to M18, further comprising:
executing a relay setup procedure for setting up the relay device.

EMBODIMENT M20

The method according to any one of embodiments M1 to M19, wherein the method is performed on or with a mobile device and/or an Internet-of-Things, IoT device.

EMBODIMENT M21

The method according to any one of embodiments M1 to M20, wherein the at least one HARQ transmission of the sidelink transport block is a first HARQ transmission of the sidelink transport block.

EMBODIMENT M22

The method according to embodiment M15, wherein the more than one consecutive HARQ transmissions of the sidelink transport block include the first HARQ transmission of the sidelink transport block.

EMBODIMENT M23

An method comprising at least one processor and at least one memory including computer program code, the at least one memory and the computer program code configured to, with the at least one processor, cause the method to at least perform:
receiving from a transmitter at least one HARQ transmission of a sidelink transport block, the HARQ transmission including a destination identifier information indicative of a destination identifier for a receiver, and
at least in the case that the at least one HARQ transmission has been successfully received,
monitoring for a receiver HARQ feedback on the at least one HARQ transmission from the receiver to obtain a receiver HARQ feedback monitoring result, and
determining, as a function of the receiver HARQ feedback monitoring result, a relay decision on whether or not to relay data of the at least one HARQ transmission to the receiver.

EMBODIMENT M24

The method according to claim M23, wherein
determining the relay decision includes:
determining to relay data of the at least one HARQ transmission to the receiver if the receiver HARQ feedback monitoring result is indicative of a discontinuous transmission, e.g. HARQ DTX.

EMBODIMENT M25

The method according to claim M23 or M24, wherein determining the relay decision includes:
determining to relay data of the at least one HARQ transmission to the receiver if the receiver HARQ feedback monitoring result is indicative of a negative acknowledgement, e.g. HARQ NACK.

EMBODIMENT M26

The method according to any one of embodiments M23 to M25 further comprising:
transmitting to the transmitter a relay HARQ feedback indicative of a negative acknowledgement, e.g. HARQ NACK, if the at least one HARQ transmission was unsuccessfully received.

EMBODIMENT M27

The method according to any one of embodiments M23 to M26, further comprising:
after transmission of the relay HARQ feedback message indicative of the negative acknowledgement information, receiving from the transmitter at least one HARQ retransmission of the sidelink transport block.

EMBODIMENT M28

The method according to any one of embodiments M23 to M27 further comprising:
if the at least one HARQ transmission has been successfully received, skipping transmission of a relay HARQ feedback indicative of a positive acknowledgment, e.g. HARQ ACK, to the transmitter.

EMBODIMENT M29

The method according to any one of embodiments M23 to M28, further comprising:
depending on the relay decision, relaying data of the at least one HARQ transmission or HARQ retransmission to the receiver.

EMBODIMENT M30

The method according to any one of embodiments M23 to M29, further comprising:
monitoring for a sidelink HARQ feedback on the relayed data from the receiver to obtain a sidelink HARQ feedback monitoring result.

EMBODIMENT M31

The method according to any one of embodiments M23 to M30, wherein the at least one HARQ transmission of the sidelink transport block is a first HARQ transmission of the sidelink transport block.

EMBODIMENT M32

The method according to any one of embodiments M23 to M32, wherein the method performed on or with a mobile device and/or an Internet-of-Things, IoT device.

EMBODIMENT C1

A tangible computer-readable medium storing computer program code, the computer program code when executed by a processor causing an apparatus to perform and/or control:
- transmitting at least one HARQ transmission of a sidelink transport block, the at least one HARQ transmission including a destination identifier information indicative of a destination identifier for a receiver,
- monitoring for a receiver HARQ feedback on the at least one HARQ transmission from the receiver to obtain a receiver HARQ feedback monitoring result,
- monitoring for a relay HARQ feedback on the at least one HARQ transmission from a relay device to obtain a relay HARQ feedback monitoring result, and
- determining, as a function of the receiver HARQ feedback monitoring result and on the relay HARQ feedback monitoring result, a retransmission decision on whether or not to transmit at least one HARQ retransmission of the sidelink transport block.

EMBODIMENT C2

The tangible computer-readable medium according to embodiment C1, the computer program code when executed by a processor causing an apparatus to perform and/or control:
- depending on the retransmission decision, transmitting the at least one HARQ retransmission.

EMBODIMENT C3

The tangible computer-readable medium according to embodiment C1 or C2, the computer program code when executed by a processor causing an apparatus to perform and/or control:
- the HARQ retransmission includes a destination identifier information indicative of a destination identifier for the relay device.

EMBODIMENT C4

The tangible computer-readable medium according to any one of embodiments C1 to C3, the computer program code when executed by a processor causing an apparatus to perform and/or control:
- determining the retransmission decision includes:
  - determining to retransmit the at least one HARQ retransmission at least in the case that the receiver HARQ feedback monitoring result is indicative of a discontinuous transmission, e.g. HARQ DTX, and the relay HARQ feedback monitoring result is indicative of a negative acknowledgement, e.g. HARQ NACK.

EMBODIMENT C5

The tangible computer-readable medium according to any one of embodiments C1 to C4, the computer program code when executed by a processor causing an apparatus to perform and/or control:
- transmitting the at least one HARQ transmission includes:
  - transmitting the at least one HARQ transmission as groupcast sidelink HARQ transmission.

EMBODIMENT C6

The tangible computer-readable medium according to any one of embodiments C1 to C5, the computer program code when executed by a processor causing an apparatus to perform and/or control:
- transmitting the at least one HARQ retransmission includes:
  - transmitting the at least one HARQ retransmission as unicast sidelink HARQ (re) transmission.

EMBODIMENT C7

The tangible computer-readable medium according to any one of embodiments C1 to C6, the computer program code when executed by a processor causing an apparatus to perform and/or control:
- determining the retransmission decision includes:
  - determining to transmit the at least one HARQ retransmission in the case that the receiver HARQ feedback monitoring result and the relay HARQ feedback monitoring result are each indicative of a negative acknowledgement, e.g. HARQ NACK.

EMBODIMENT C8

The tangible computer-readable medium according to any one of embodiments C1 to C7, the computer program code when executed by a processor causing an apparatus to perform and/or control:
- determining the retransmission decision includes:
  - determining not to transmit the at least one HARQ retransmission in the case that the receiver HARQ feedback monitoring result and the relay HARQ feedback monitoring result are each indicative of a discontinuous transmission, e.g. HARQ DTX.

EMBODIMENT C9

The tangible computer-readable medium according to any one of embodiments C1 to C8, the computer program code when executed by a processor causing an apparatus to perform and/or control:
- terminating the HARQ process in the case that the receiver HARQ feedback monitoring result and the relay HARQ feedback monitoring result are each indicative of a discontinuous transmission, e.g. HARQ DTX.

EMBODIMENT C10

The tangible computer-readable medium according to any one of embodiments C1 to C9, the computer program code when executed by a processor causing an apparatus to perform and/or control:
- determining the retransmission decision includes:
  - determining not to transmit the at least one HARQ retransmission in the case that the receiver HARQ feedback monitoring result is indicative of a negative acknowledgement, e.g. HARQ NACK, and the relay HARQ feedback monitoring result is indicative of a discontinuous transmission, e.g. HARQ DTX.

EMBODIMENT C11

The tangible computer-readable medium according to any one of embodiments C1 to C10, the computer program code when executed by a processor causing an apparatus to perform and/or control:

terminating the HARQ process in the case that the receiver HARQ feedback monitoring result is indicative of a negative acknowledgement, e.g. HARQ NACK, and the relay HARQ feedback monitoring result is indicative of a discontinuous transmission, e.g. HARQ DTX.

EMBODIMENT C12

The tangible computer-readable medium according to any one of embodiments C1 to C11, the computer program code when executed by a processor causing an apparatus to perform and/or control:
determining the retransmission decision includes:
  determining not to transmit the at least one HARQ retransmission in the case that the receiver HARQ feedback monitoring result is indicative of a positive acknowledgement, e.g. HARQ ACK.

EMBODIMENT C13

The tangible computer-readable medium according to any one of embodiments C1 to C12, the computer program code when executed by a processor causing an apparatus to perform and/or control:
terminating the HARQ process in the case that the receiver HARQ feedback monitoring result is indicative of a positive acknowledgment, e.g. HARQ ACK.

EMBODIMENT C14

The tangible computer-readable medium according to any one of embodiments C8 to C13, the computer program code when executed by a processor causing an apparatus to perform and/or control:
releasing the relay device.

EMBODIMENT C15

The tangible computer-readable medium according to any one of embodiments C1 to C14, the computer program code when executed by a processor causing an apparatus to perform and/or control:
transmitting more than one consecutive HARQ transmissions of the sidelink transport block,
monitoring for respective receiver HARQ feedbacks on the respective HARQ transmissions from the receiver to obtain respective receiver HARQ feedback monitoring results and
monitoring for respective relay HARQ feedbacks on the respective HARQ transmissions from the relay device to obtain respective relay HARQ feedback monitoring results,
determining, as a function of the respective receiver HARQ feedback monitoring results and on the respective relay HARQ feedback monitoring result, a respective retransmission decision on whether or not to transmit at least one respective HARQ retransmission of the sidelink transport block.

EMBODIMENT C16

The tangible computer-readable medium according to any one of embodiments C1 to C15, the computer program code when executed by a processor causing an apparatus to perform and/or control:
monitoring for a message including sidelink control information (SCI) from the relay device to the receiver to obtain an SCI monitoring result, and,
optionally, determining a termination decision on whether or not to terminate HARQ process as a function of the SCI monitoring result.

EMBODIMENT C17

The tangible computer-readable medium according to any one of embodiments C1 to C16, the computer program code when executed by a processor causing an apparatus to perform and/or control:
monitoring for a sidelink HARQ feedback from the receiver to the relay to obtain an SL HARQ feedback monitoring result, and
optionally, determining a releasing decision on whether or not to release the relay as a function of the SL HARQ feedback monitoring result.

EMBODIMENT C18

The tangible computer-readable medium according to any one of embodiments C1 to C17, the computer program code when executed by a processor causing an apparatus to perform and/or control:
monitoring for a sidelink HARQ feedback from the receiver to the transmitter or to the relay device to obtain an SL HARQ feedback monitoring result, and
depending on the SL HARQ feedback monitoring result, releasing of the relay device.

EMBODIMENT C19

The tangible computer-readable medium according to any one of embodiments C1 to C18, the computer program code when executed by a processor causing an apparatus to perform and/or control:
executing a relay setup procedure for setting up the relay device.

EMBODIMENT C20

The tangible computer-readable medium according to any one of embodiments C1 to C19, wherein the apparatus is a mobile device and/or an Internet-of-Things, IoT device.

EMBODIMENT C21

The apparatus according to any one of embodiments C1 to C20, wherein the at least one HARQ transmission of the sidelink transport block is a first HARQ transmission of the sidelink transport block.

EMBODIMENT C22

The apparatus according to embodiment C15, wherein the more than one consecutive HARQ transmissions of the sidelink transport block include the first HARQ transmission of the sidelink transport block.

EMBODIMENT C23

A tangible computer-readable medium storing computer program code, the computer program code when executed by a processor causing an apparatus to perform and/or control:

receiving from a transmitter at least one HARQ transmission of a sidelink transport block, the HARQ transmission including a destination identifier information indicative of a destination identifier for a receiver, and at least in the case that the at least one HARQ transmission has been successfully received, monitoring for a receiver HARQ feedback on the at least one HARQ transmission from the receiver to obtain a receiver HARQ feedback monitoring result, and determining, as a function of the receiver HARQ feedback monitoring result, a relay decision on whether or not to relay data of the at least one HARQ transmission to the receiver.

EMBODIMENT C24

The tangible computer-readable medium according to claim C23, the computer program code when executed by a processor causing an apparatus to perform and/or control:

determining the relay decision includes:
determining to relay data of the at least one HARQ transmission to the receiver if the receiver HARQ feedback monitoring result is indicative of a discontinuous transmission, e.g. HARQ DTX.

EMBODIMENT C25

The tangible computer-readable medium according to claim C23 or C24, the computer program code when executed by a processor causing an apparatus to perform and/or control:

determining the relay decision includes:
determining to relay data of the at least one HARQ transmission to the receiver if the receiver HARQ feedback monitoring result is indicative of a negative acknowledgement, e.g. HARQ NACK.

EMBODIMENT C26

The tangible computer-readable medium according to any one of embodiments C23 to C25 the computer program code when executed by a processor causing an apparatus to perform and/or control:

transmitting to the transmitter a relay HARQ feedback indicative of a negative acknowledgement, e.g. HARQ NACK, if the at least one HARQ transmission was unsuccessfully received.

EMBODIMENT C27

The tangible computer-readable medium according to embodiment C26, the computer program code when executed by a processor causing an apparatus to perform and/or control:

after transmission of the relay HARQ feedback message indicative of the negative acknowledgement information, receiving from the transmitter at least one HARQ retransmission of the sidelink transport block.

EMBODIMENT C28

The tangible computer-readable medium according to any one of embodiments C23 to C27 the computer program code when executed by a processor causing an apparatus to perform and/or control:

if the at least one HARQ transmission has been successfully received, skipping transmission of a relay HARQ feedback indicative of a positive acknowledgment, e.g. HARQ ACK, to the transmitter.

EMBODIMENT C29

The tangible computer-readable medium according to any one of embodiments C23 to C28, the computer program code when executed by a processor causing an apparatus to perform and/or control:

depending on the relay decision, relaying data of the at least one HARQ transmission or HARQ retransmission to the receiver.

EMBODIMENT C30

The tangible computer-readable medium according to any one of embodiments C23 to C29, the computer program code when executed by a processor causing an apparatus to perform and/or control:

monitoring for a sidelink HARQ feedback on the relayed data from the receiver to obtain a sidelink HARQ feedback monitoring result.

EMBODIMENT C31

The tangible computer-readable medium according to any one of embodiments C23 to C30, the computer program code when executed by a processor causing an apparatus to perform and/or control:

the at least one HARQ transmission of the sidelink transport block is a first HARQ transmission of the sidelink transport block.

EMBODIMENT C32

The tangible computer-readable medium according to any one of embodiments C23 to C31, wherein the apparatus is a mobile device and/or an Internet-of-Things, IoT device.

EMBODIMENT G1

An apparatus comprising at least one processor and at least one memory including computer program code, the at least one memory and the computer program code configured to, with the at least one processor, cause an apparatus at least to perform and/or control the method of the first exemplary aspect.

Example embodiments may thus be utilized to enable enhancements and solutions necessary to support high accuracy (e.g. horizontal and/or vertical), low latency, network efficiency (scalability, RS overhead, etc.) and device efficiency (power consumption, complexity) requirements for commercial uses cases (including general commercial use cases and specifically (I)IoT use cases.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of one of the enumerated features is possible. The specific combination of all subsequently enumerated features may as well be considered. Also, a plurality of one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

With the invention and its different aspects described herein, it may for example be possible to achieve one or more of the following to facilitate SL data transmission for unicast SL between a transmitter, e.g. Tx UE, and a receiver, e.g. Rx UE, using SL-based UE-to-UE relay via a relay device, e.g. R-UE; and to enable and facilitate a seamless return to the direct SL mode from the current UE-to-UE relay mode as soon as the direct SL mode becomes applicable again for the unicast SL of a transmitter, e.g. Tx UE, and a receiver, e.g. Rx UE.

What is claimed is:

1. An apparatus comprising at least one processor and at least one memory including computer program code, the at least one memory and the computer program code configured to, with the at least one processor, cause the apparatus at least to:

transmit at least one Hybrid Automatic Repeat Request (HARQ) transmission of a sidelink transport block, the at least one HARQ transmission including a destination identifier information indicative of a destination identifier for a receiver;

monitor a receiver HARQ feedback on the at least one HARQ transmission from the receiver to obtain a receiver HARQ feedback monitoring result;

monitor a relay HARQ feedback on the at least one HARQ transmission from a relay device to obtain a relay HARQ feedback monitoring result; and determine, based on the receiver HARQ feedback monitoring result and the relay HARQ feedback monitoring result, a retransmission decision on whether to transmit at least one HARQ retransmission of the sidelink transport block, wherein the determining the retransmission decision comprises at least one of:

determining not to transmit the at least one HARQ retransmission in a case that the receiver HARQ feedback monitoring result and the relay HARQ feedback monitoring result are each indicative of a discontinuous transmission: or determining not to transmit the at least one HARQ retransmission in a case that the receiver HARQ feedback monitoring result is indicative of a negative acknowledgement, and the relay HARQ feedback monitoring result is indicative of a discontinuous transmission.

2. The apparatus according to claim 1, wherein the at least one processor and the computer program code are configured to cause the apparatus further to:

transmit the at least one HARQ retransmission based on the retransmission decision.

3. The apparatus according to claim 1, wherein the at least one HARQ retransmission includes a destination identifier information indicative of a destination identifier for the relay device.

4. The apparatus according to claim 1, wherein the at least one HARQ transmission comprises a groupcast sidelink HARQ transmission.

5. The apparatus according to claim 1, wherein the at least one processor and the computer program code are further configured to cause the apparatus to:

transmit more than one consecutive HARQ transmission of the sidelink transport block;

monitor HARQ feedback on each of the HARQ transmissions from the receiver, to obtain a corresponding receiver HARQ feedback monitoring result;

monitor HARQ feedback on each of the HARQ transmissions from the relay device, to obtain a corresponding relay HARQ feedback monitoring result; and determine, based on the corresponding receiver HARQ feedback monitoring result and the corresponding relay HARQ feedback monitoring result, a respective retransmission decision on whether or not to transmit a corresponding HARQ retransmission of the sidelink transport block.

6. An apparatus comprising at least one processor and at least one memory including computer program code, the at least one memory and the computer program code configured to, with the at least one processor, cause the apparatus at least to:

receive, from a transmitter, at least one Hybrid Automatic Repeat Request (HARQ) transmission of a sidelink transport block, the at least one HARQ transmission including a destination identifier information indicative of a destination identifier for a receiver; and at least in a case that the at least one HARQ transmission has been successfully received:

monitor a receiver HARQ feedback on the at least one HARQ transmission from the receiver to obtain a receiver HARQ feedback monitoring result; and determine, based on the receiver HARQ feedback monitoring result, a relay decision on whether to relay data of the at least one HARQ transmission to the receiver; and wherein the relay decision comprises determining to relay the data of the at least one HARQ transmission to the receiver if the receiver HARQ feedback monitoring result is indicative of a discontinuous transmission.

7. The apparatus according to claim 6, wherein the relay decision further comprises:

determining to relay the data of the at least one HARQ transmission to the receiver if the receiver HARQ feedback monitoring result is indicative of a discontinuous transmission or a negative acknowledgement.

8. A method, comprising:

transmitting at least one Hybrid Automatic Repeat Request (HARQ) transmission of a sidelink transport block, the at least one HARQ transmission including a destination identifier information indicative of a destination identifier for a receiver;

monitoring a receiver HARQ feedback on the at least one HARQ transmission from the receiver to obtain a receiver HARQ feedback monitoring result;

monitoring a relay HARQ feedback on the at least one HARQ transmission from a relay device to obtain a relay HARQ feedback monitoring result; and determining, based on the receiver HARQ feedback monitoring result and the relay HARQ feedback monitoring result, a retransmission decision on whether or not to transmit at least one HARQ retransmission of the sidelink transport block;

wherein the determining the retransmission decision comprises at least one of:

determining not to transmit the at least one HARQ retransmission in a case that the receiver HARQ feedback monitoring result and the relay HARQ feedback monitoring result are each indicative of a discontinuous transmission; or determining not to transmit the at least one HARQ retransmission in a case that the receiver HARQ feedback monitoring result is indicative of a negative acknowledgement, and the relay HARQ feedback monitoring result is indicative of a discontinuous transmission.

9. A method, comprising:

receiving, from a transmitter, at least one Hybrid Automatic Repeat Request (HARQ) transmission of a sidelink transport block, the at least one HARQ transmission including a destination identifier information indicative of a destination identifier for a receiver; and at least in a case that the at least one HARQ transmission has been successfully received:

monitoring a receiver HARQ feedback on the at least one HARQ transmission from the receiver to obtain a receiver HARQ feedback monitoring result; and determining, based on the receiver HARQ feedback monitoring result, a relay decision on whether or not to relay data of the at least one HARQ transmission to the receiver, wherein the determining the relay decision comprises:

determining to relay the data of the at least one HARQ transmission to the receiver if the receiver HARQ feedback monitoring result is indicative of a discontinuous transmission.

* * * * *